US011902265B2

(12) United States Patent
Kaliski, Jr. et al.

(10) Patent No.: US 11,902,265 B2
(45) Date of Patent: Feb. 13, 2024

(54) SYMMETRIC-KEY INFRASTRUCTURE

(71) Applicant: VeriSign, Inc., Reston, VA (US)

(72) Inventors: Burton S. Kaliski, Jr., McLean, VA (US); Glen S. Wiley, Maidens, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 17/882,401

(22) Filed: Aug. 5, 2022

(65) Prior Publication Data

US 2022/0376898 A1 Nov. 24, 2022

Related U.S. Application Data

(63) Continuation of application No. 16/877,804, filed on May 19, 2020, now Pat. No. 11,438,318, which is a
(Continued)

(51) Int. Cl.
*H04L 9/08* (2006.01)
*H04L 9/40* (2022.01)
(Continued)

(52) U.S. Cl.
CPC .......... *H04L 63/062* (2013.01); *G06F 16/958* (2019.01); *H04L 9/085* (2013.01);
(Continued)

(58) Field of Classification Search
CPC ... H04L 63/062; H04L 9/0822; H04L 9/0836; H04L 9/085; H04L 9/0861; H04L 41/0806; H04L 61/4511; G06F 16/958
See application file for complete search history.

(56) References Cited

U.S. PATENT DOCUMENTS 4,386,233 A 5/1983 Smid et al.
4,850,017 A 7/1989 Matyas, Jr. et al.
(Continued)

OTHER PUBLICATIONS

Ansi X9.102-2008 (R2017). Symmetric Key Cryptography for the Financial Services Industry—Wrapping of Keys and Associated Data. American National Standards Institute, 2008 (revised 2017), pp. 1-43.
(Continued)

*Primary Examiner* — Baotran N To
(74) *Attorney, Agent, or Firm* — McCarter & English, LLP; Michael A. Sartori

(57) ABSTRACT

Techniques for provisioning a key server to facilitate secure communications between a web server and a client by providing the client with a first data structure including information on how the web server may obtain a target symmetric key are presented. The techniques can include: provisioning the key server with a second data structure including information on how the key server may generate the first data structure; receiving a request on behalf of a web server for a third data structure comprising information on how the client may obtain the first data structure from the key server; and obtaining the third data structure, such that the third data structure is published in association with an identification of the web server, and such that the client uses the third data structure to obtain the first data structure and uses the first data structure to communicate with the web server.

20 Claims, 6 Drawing Sheets

Related U.S. Application Data continuation of application No. 16/231,095, filed on Dec. 21, 2018, now Pat. No. 10,701,046, which is a continuation-in-part of application No. 15/792,457, filed on Oct. 24, 2017, now Pat. No. 10,680,806.

(51) Int. Cl.
*G06F 16/958* (2019.01)
*H04L 41/0806* (2022.01)
*H04L 61/4511* (2022.01)

(52) U.S. Cl.
CPC .......... *H04L 9/0822* (2013.01); *H04L 9/0836* (2013.01); *H04L 9/0861* (2013.01); *H04L 41/0806* (2013.01); *H04L 61/4511* (2022.05)

(56) References Cited

U.S. PATENT DOCUMENTS

| | | | |
|---|---|---|---|
| 6,231,095 B1 | 5/2001 | Chou et al. | |
| 6,889,321 B1 | 5/2005 | Kung et al. | |
| 8,532,303 B2* | 9/2013 | Sunder | H04L 63/0428 380/278 |
| 10,680,806 B1* | 6/2020 | Kaliski, Jr. | H04L 9/3226 |
| 10,701,046 B1* | 6/2020 | Kaliski, Jr. | H04L 63/062 |
| 11,438,318 B2* | 9/2022 | Kaliski, Jr. | H04L 61/4511 |
| 2003/0070067 A1 | 4/2003 | Saito | |
| 2008/0019526 A1 | 1/2008 | Fu et al. | |
| 2010/0325423 A1 | 12/2010 | Etchegoyen | |
| 2012/0011360 A1* | 1/2012 | Engels | H04L 9/083 380/278 |
| 2017/0093802 A1* | 3/2017 | Norum | H04L 63/0428 |
| 2017/0359323 A1 | 12/2017 | Weis et al. | |

OTHER PUBLICATIONS

Atkinson, "Key Exchange Delegation Record for the DNS", IETF RFC 2230, Nov. 1997, pp. 1-11.
Barker et al., "Recommendation for Pair-Wise Key Establishment Schemes Using Discrete Logarithm Cryptography", NIST Special Publication 800-56A Revision 2, May 2013, pp. 1-127.
ISO 8732:1988 (E). Banking—Key management (Wholesale). International Organization for Standardization, Nov. 15, 1988, pp. 1-90.
Kohl et al., "The Kerberos Network Authentication Service (V5)", IETF RFC 1510, Sep. 1993, pp. 1-112.
Krawczyk et al., "HMAC-based Extract-and-Expand Key Derivation Function (HKDF)", IETF RFC 5869, May 2010, pp. 1-14.
Krawczyk et al., "The OPTLS Protocol and TLS 1.3" 2016 IEEE European Symposium on Security and Privacy (EuroS P), Mar. 2016, pp. 1-27.
Matyas et al., "Generation, distribution, and installation of cryptographic keys", IBM Systems Journal, vol. 17, Issue 2, 1978, pp. 126-137.
Matyas, "Key processing with control vectors", Journal of Cryptology, vol. 3, Issue 2, Jan. 1991, pp. 113-136.
Morris Dworkin, "Recommendation for Block Cipher Modes of Operation: Methods for Key Wrapping", NIST Special Publication 800-38F, Dec. 2012, pp. 1-32.
Neuman et al., The Kerberos Network Authentication Service (V5), Network Working Group, Request for Comments: 4120, Standards Track, Jul. 2005, pp. 1-138.
NIST, "AES Key Wrap Specification", Nov. 16, 2001, pp. 1-23.
NIST, FIPS 171: Key Management Using ANSI X9.17, Apr. 27, 1992, Retrieved from the Internet: http://securityv.isu.edu/isl/fips171.html, pp. 1-26.
Rescorla, "The Transport Layer Security (TLS) Protocol Version 1.3", Jul. 3, 2017, Retrieved from the Internet: https://tools.ietf.org/pdf/draft-ietf-tls-tls13-21.pdf, pp. 1-143.
Salowey et al., "Transport Layer Security (TLS) Session Resumption without Server-Side State", IETF RFC 5077, Jan. 2008, pp. 1-20.
SMID, "Computer Science Technology: a Key Notarization System for Computer Networks", National Bureau of Standards Special Publication 500-54, 1979, pp. 1-40.
U.S. Office Action issued in corresponding U.S. Appl. No. 15/792,457 dated Jul. 11, 2019, pp. 1-12.

* cited by examiner

SYMMETRIC-KEY INFRASTRUCTURE

PRIORITY

This application is a continuation of the U.S. patent application having Ser. No. 16/877,804, filed May 19, 2020, which claims priority to, and the benefit of, earlier filed application Ser. No. 16/231,095 entitled "SYMMETRIC-KEY INFRASTRUCTURE", filed Dec. 21, 2018, as a continuation, which claims priority to, and the benefit of, earlier-filed application Ser. No. 15/792,457 entitled "DNS-BASED SYMMETRIC KEY INFRASTRUCTURE", filed Oct. 24, 2017, as a continuation-in-part.

FIELD

This disclosure relates generally to internet security.

BACKGROUND

The domain name system (DNS) is a hierarchical distributed naming system for resources provided by computer servers that are connected to the internet. It associates domain names to numeric internet protocol (IP) addresses of internet resources, including resources managed by web hosting providers, which provide the web server computers that serve the web pages associated with domain names. The DNS thus allows computers and humans to access networked resources, including web pages, using names.

SUMMARY

According to various embodiments, a method of provisioning a key server to facilitate secure communications between a web server and a client of the web server by providing the client with a first data structure including information on how the web server may obtain at least one target symmetric key to use in communications with the client, the method including: provisioning the key server with a second data structure including information on how the key server may generate the first data structure; receiving electronically, by a provisioning server, a request on behalf of a web server for a third data structure including information on how the client may obtain the first data structure from the key server; and obtaining, by the provisioning server and in response to the request, a third data structure including information on how the client may obtain the first data structure from the key server, such that the third data structure is published by a publishing server for public access in association with an identification of the web server; such that the client uses the third data structure to obtain the first data structure from the key server and uses the first data structure to communicate with the web server.

According to an embodiment, the method may include other features. The method may include generating, by the provisioning server, the second data structure. The method may include receiving, in the request, information sufficient to generate the second data structure. The method may include including publishing, by the publishing server, the third data structure. The method may include publishing the third data structure in association with an identification of a second web server. The publishing server may include a Domain Name System (DNS) server. The third data structure may include a web address through which the client may obtain both the first data structure and a fourth data structure including information on how the client may obtain the target symmetric key in response to a request to produce the first data structure and the fourth data structure, and the method may include: provisioning the key server with a fifth data structure providing information on how to generate the fourth data structure. The third data structure may include a web address through which the client may obtain the first data structure in response to a request to translate a fourth data structure including information on how the key server may obtain the target symmetric key into the first data structure, and the method may include provisioning the key server with a fifth data structure providing information on how to translate the fourth data structure into the first data structure. The information on how the web server may obtain the target symmetric key may further include at least one of an identification of a storage location of the target symmetric key or the identification of a mechanism for exporting the target symmetric key from shared context. The information on how the web server may obtain the target symmetric key may include information on how the web server may obtain a symmetric key derivation key and information on how to derive the target symmetric key from the symmetric key derivation key. The information on how the web server may obtain the target symmetric key may include information on how the web server may obtain a symmetric key wrapping key and information on how to unwrap a wrapped target symmetric key with the symmetric key wrapping key. The information on how the web server may obtain the target symmetric key may include information on how the web server may obtain at least two key shares and information on how the web server may obtain the target symmetric key from the at least two key shares. The information on how the key server may generate the first data structure may include information on how the key server may obtain a subordinate key. The information on how the key server may generate the first data structure may include information on how the key server may obtain a subordinate key and information on how the web server may obtain the subordinate key.

According to various embodiments, a system for provisioning a key server to facilitate secure communications between a web server and a client of the web server by providing the client with a first data structure including information on how the web server may obtain at least one target symmetric key to use in communications with the client is presented. The system includes at least one provisioning server communicatively coupled to the internet and configured to perform operations including: provisioning the key server with a second data structure including information on how the key server may generate the first data structure; receiving electronically a request on behalf of the web server for a third data structure including information on how the client may obtain the first data structure from the key server; and obtaining, in response to the request, a third data structure including information on how the client may obtain the first data structure from the key server, such that the third data structure is published by a publishing server for public access in association with an identification of the web server; such that the client uses the third data structure to obtain the first data structure from the key server and uses the first data structure to communicate with the web server.

According to an embodiment, the system may include other features. The operations may include generating the second data structure. The operations may include receiving, in the request, information sufficient to generate the second data structure. The system may include the publishing server, where the publishing server is configured to publish the third data structure. The operations may further include publishing the third data structure in association with an identification of a second web server. The publishing server may include a Domain Name System (DNS) server. The third data structure may include a web address through which the client may obtain both the first data structure and a fourth data structure including information on how the client may obtain the target symmetric key in response to a request to produce the first data structure and the fourth data structure, and the operations may include: provisioning the key server with a fifth data structure providing information on how to generate the fourth data structure. The third data structure may include a web address through which the client may obtain the first data structure in response to a request to translate a fourth data structure including information on how the key server may obtain the target symmetric key into the first data structure, and the operations may include: provisioning the key server with a fifth data structure providing information on how to translate the fourth data structure into the first data structure. The information on how the web server may obtain the target symmetric key may include at least one of an identification of a storage location of the target symmetric key or the identification of a mechanism for exporting the target symmetric key from shared context. The information on how the web server may obtain the target symmetric key may include information on how the web server may obtain a symmetric key derivation key and information on how to derive the target symmetric key from the key derivation key. The information on how the web server may obtain the target symmetric key may include information on how the web server may obtain a symmetric key wrapping key and information on how to unwrap a wrapped target symmetric key with the key wrapping key. The information on how the web server may obtain the target symmetric key may include information on how the web server may obtain at least two key shares and information on how the web server may obtain the target symmetric key from the at least two key shares. The information on how the key server may generate the first data structure may include information on how the key server may obtain a subordinate key. The information on how the key server may generate the first data structure may include information on how the key server may obtain a subordinate key and information on how the web server may obtain the subordinate key.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
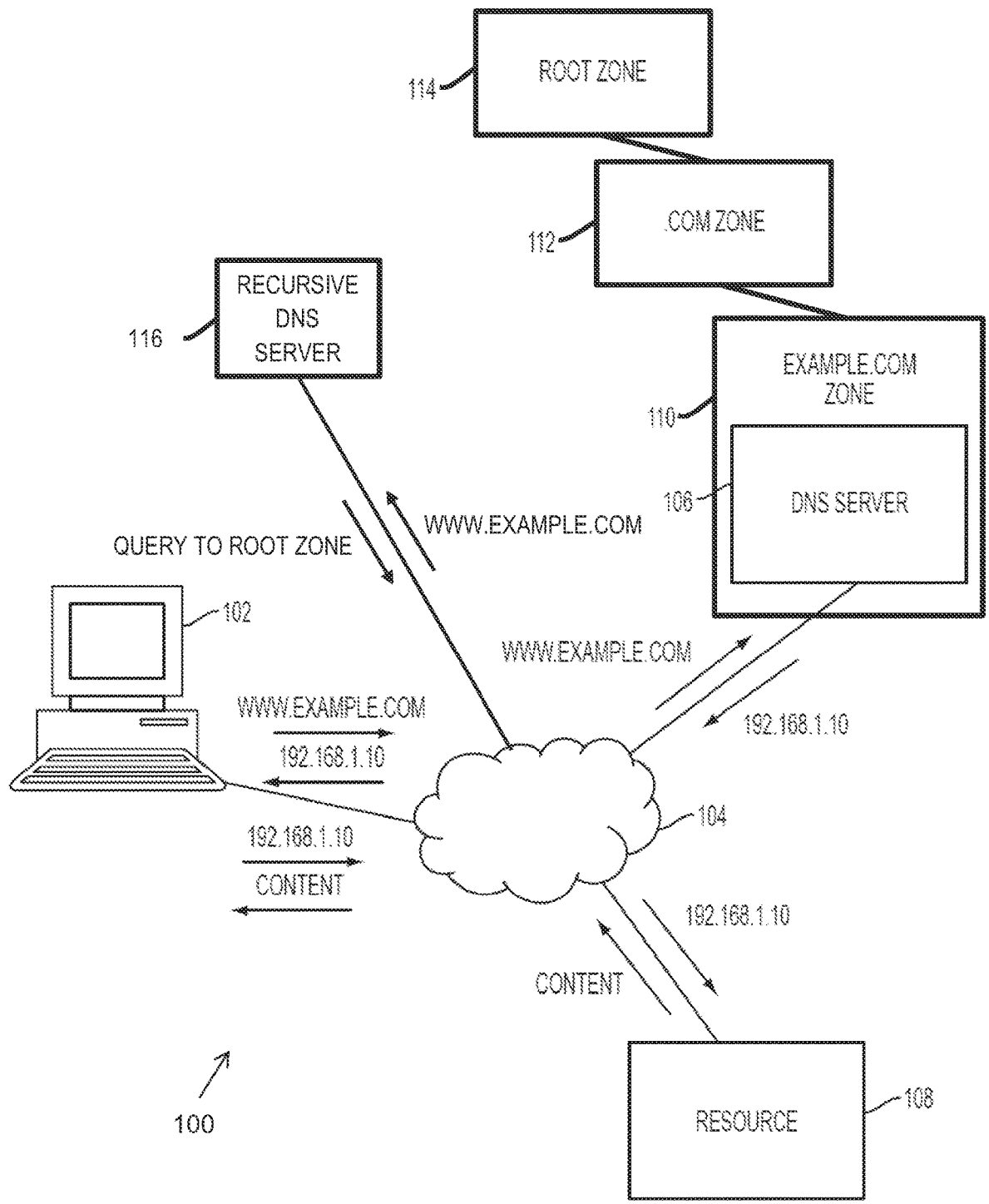
FIG. 1 is a schematic diagram illustrating a portion of the domain name system according to some embodiments.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Part A: Example Embodiments

This disclosure includes two parts, Part A and Part B. Part A shows and describes various embodiments, including embodiments that may be implemented in the complete absence of secure public-key cryptosystems. Part B shows and describes various additional embodiments, including embodiments that may be implemented using some public-key cryptosystems. Both parts include disclosure of embodiments that may be implemented with some public-key cryptosystems, and embodiments that may be implemented without public-key cryptosystems.

I. Introduction

Disclosed are techniques for implementing at least some types of post-quantum cryptography (a.k.a., "quantum-safe cryptography" or "PQC"), or more generally, improvements to cryptography considering not only the impact of quantum computing but also other cryptanalytic advances, while simplifying protocols and architectures. In more detail, PQC assumes that existing cryptographic techniques that rely on the apparent difficulty of solving certain mathematical problems are insecure unless such mathematical problems have been proven to be difficult in a technical sense. Accordingly, PQC attempts to replace existing public-key cryptosystems that are based on the difficulty of the so-called RSA problem and/or the difficulty of computing discrete logarithms, which may be vulnerable to quantum computing, for example, with infrastructure that is based on symmetric-key cryptosystems.

PQC can also include hash-based digital signatures, and associated upgrades to public-key infrastructures (PKI) to support them. PQC can also include new public-key cryptosystems that are not vulnerable to quantum computing. PQC can also include techniques to smoothly transition from today's cryptography to these new approaches. Lastly, and the subject of the present document, PQC can include symmetric-key infrastructures. Such PQC symmetric-key infrastructure may be used to secure (e.g., encrypt) a communications channel between two internet-connected computers.

PQC provides answers to the question: If conventional public-key cryptosystems are insecure or not available, how can clients (note that as used herein, the term "client" refers to a client computer.) and servers set up secure connections, at internet scale, with high assurance? Conventional PKI, such as RSA, Diffie-Hellman, elliptic curve, etc., is potentially at risk due to cryptanalytic advances, mathematical advances, and quantum computing. Non-conventional public-key cryptosystems (e.g., based on lattices, etc.) are not yet well enough understood to be relied upon with confidence. Furthermore, if new non-conventional public-key cryptosystems are initially deployed, there may not be sufficient interoperability among implementations. It is desirable therefore to separate the distribution of symmetric keys from their use for securing communications, hence another motivation for a symmetric-key infrastructure. Existing hash-based signatures may only support authentication, rather than encryption. Existing symmetric-key infrastructures, which were originally designed for enterprise-scale closed networks, cannot be reliably extended to operate at an internet scale. Lastly, known internet-scale extensions of existing symmetric-key infrastructures utilize public-key cryptosystems to some extent. Accordingly, there is a need for robust, secure, internet-scale symmetric-key infrastructure.

According to an embodiments, PQC is provided in the form of a DNS-based symmetric-key infrastructure (SKI). According to some embodiments, a client computer obtains a shared symmetric key for use with a web (or other) server computer via a network of symmetric key server computers, referred to herein as "key servers". The web (or other) server that the client wishes to communicate with securely may publish names of its authoritative key servers in the DNS. According to some embodiments, a client may utilize a recursive key server in order to obtain a symmetric key for securely communicating with a web server. According to such embodiments, the recursive key server interacts with a network of key servers on the client's behalf to ensure that both the client and the web server share a common symmetric key. The client and web server then secure (e.g., encrypt) communications between them based on the shared symmetric key.

Throughout this document, "share a symmetric key" means either that two entities each have access to the same or a functionally equivalent version of the symmetric key, or to versions of the key such that one entity can perform an operation with its version of the key in one direction, e.g., wrapping or encrypting, and the other can perform an operation with its version in the reverse direction, e.g., unwrapping or decrypting. Furthermore, although for convenience, two entities may be described as sharing a specific symmetric key, the entities may share more than one symmetric key at a time, and may perform different operations with the different keys and/or keys derived from them, e.g., one key for securing communications and another key for wrapping and/or deriving keys. In addition, in some cases more than two entities may share a given key.

FIG. 1 is a schematic diagram 100 depicting, by way of background, an example DNS interaction, but the depicted interaction does not necessarily involve an embodiment of the invention. Instead, FIG. 1 depicts an overview of one example of how DNS enables the internet to operate using domain names instead of numerical internet protocol (IP) addresses. That is, although networked computers generally rely on numerical locators such as IP addresses, human beings are ill-equipped to memorize such locators. Accordingly, DNS enables humans to rely on easy-to-remember domain names to access resources and data.

A user may operate client computer 102. For ease of discussion, a client is identified with its hardware client computer unless otherwise specified or clear from context. The user may enter a domain name, e.g., www.example.com, in the navigation field of a web browser executing on client computer 102. Client computer 102 operates and/or contacts local recursive DNS server 116 to look up the IP address corresponding to www.example.com. In particular, client computer 102 may send a resource record query to recursive DNS server 116. For purposes of this example, recursive DNS server 116 lacks a resource record for www.example.com. In general, DNS name resolution follows the DNS hierarchy, which is based on delegation of authority from one zone to the next, according to the structure of DNS names. This hierarchy has a tree structure, from root to leaves. Therefore, recursive DNS server 116 proceeds to traverse the DNS hierarchy to find a server that has the requested information as follows. According to the DNS protocol, recursive DNS server 116 may in this example query the root zone 114 for this record. By way of a DNS name server (NS) resource record, the root server points to a DNS server for .com zone 112, which provides an NS record that points to DNS server 106 for the zone 110 for www.example.com, again, relying on an NS resource record. DNS server 106 responds to recursive DNS server 116 with an appropriate DNS record (e.g., A or AAAA) that includes the requested IP address. Client computer 102 receives the resource record from recursive DNS server 116 and parses it to extract the IP address. Client computer 102 then contacts the IP address, which leads to resource 108, which may be a server computer. Resource 108 responds with the requested data, e.g., content.

The basic DNS hierarchy traversal described in this section is utilized by various embodiments for a client to obtain a symmetric key, as described in detail presently.

II. Basic DNS-Based Symmetric-Key Infrastructure

Figure 2:
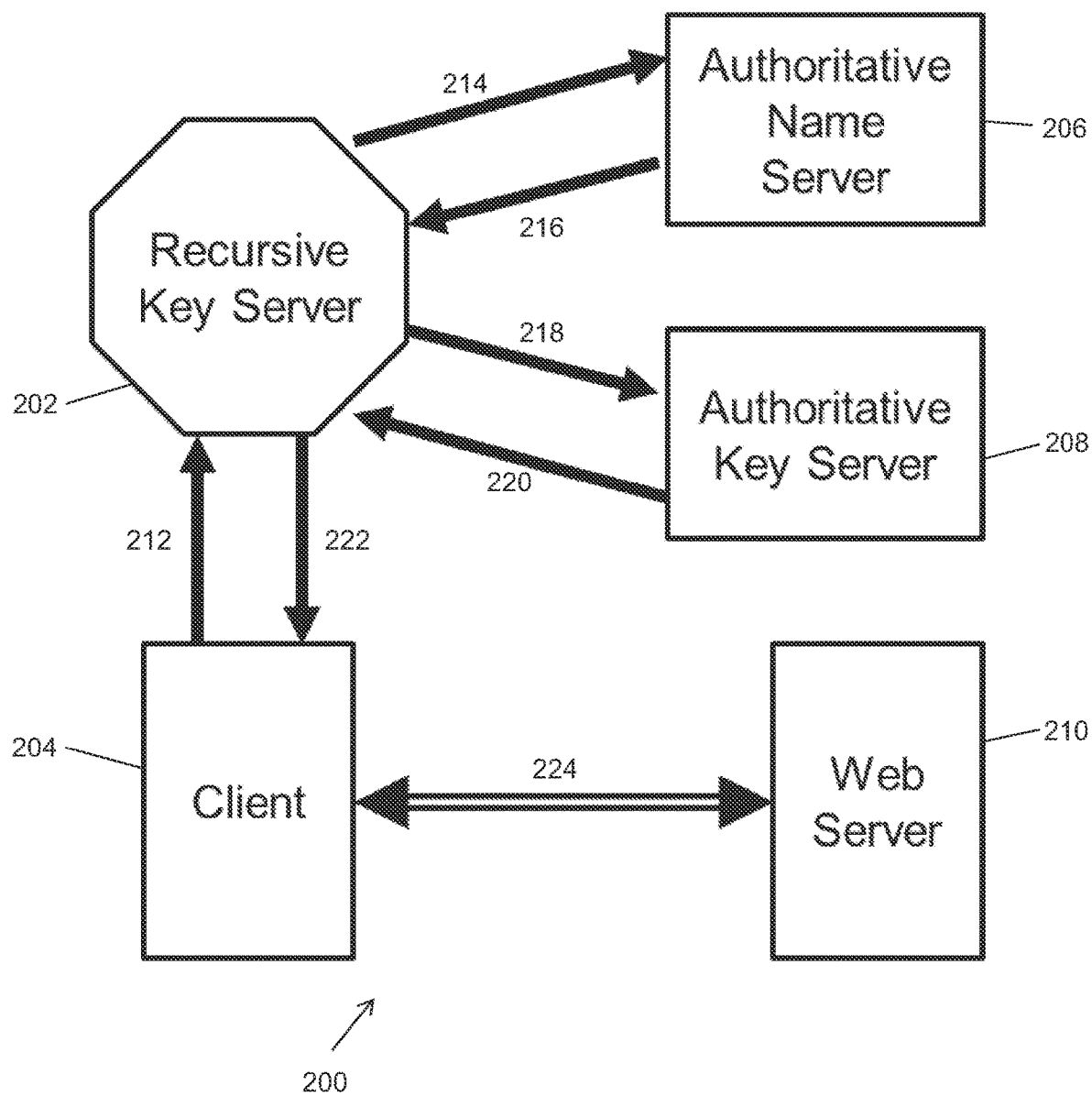
FIG. 2 is a hybrid diagram of a system for and method of implementing symmetric-key infrastructure according to some embodiments.

FIG. 2 is a hybrid diagram 200 of a system for and method of implementing symmetric-key infrastructure according to some embodiments. In particular, diagram 200 illustrates a method for distributing a symmetric key to a client and server using the DNS. Diagram 200 also depicts a system that includes recursive key server 202, client 204, authoritative name server 206, authoritative key server 208, and web server 210. Each of these entities includes an internet-connected hardware computer configured to perform operations as disclosed herein. These entities and their structures are further set forth presently and in reference to FIG. 3, below.

The method of FIG. 2 may be initiated by client 204 in order to secure communications between client 204 and web server 210. Though depicted as a web server in diagram 200, any server may benefit from the disclosed techniques, and such techniques are not limited to use with web servers. As non-limiting examples, the techniques may be employed to establish a key for securing communications between client 204 and a key server; a DNS server; an Extensible Provisioning Protocol (EPP) server; a Registration Data Access Protocol (RDAP) server; a mail server; a database; a content registry, such as a handle system registry; or a device. The techniques may also be employed to establish a key for use in securing individual objects, including email, messages, files, and cryptocurrency transactions. In addition, in some embodiments, the symmetric key may also be made accessible to additional entities, e.g., a trusted entity that may require access to communications for security purposes. The method of FIG. 2 establishes a shared, secret, symmetric key for client 204 and web server 210.

At the outset, client 204 and recursive key server 202 have previously established or have access to a symmetric key for securing a communication between them, denoted $K_{CR}$. (Throughout this disclosure, symmetric keys are denoted $K_{SUBSCRIPT}$, where "SUBSCRIPT" includes the initials of the parties that are intended to use the key so denoted.) Thus, client 204 and recursive key server 202 can set up a secure (e.g., encrypted) connection for use in exchanging other keys. Further, at the outset, web server 210 and authoritative key server 208 have likewise previously established or have access to a symmetric key for securing a communication between them, denoted $K_{AW}$. These entities can similarly set up a secure connection for use in exchanging other keys.

Thus, the method relies on minimal set up provisions. Client 204 may only initially have a shared symmetric key $K_{CR}$ with recursive key server 202, and web server 210 may only initially have shared symmetric key $K_{AW}$ with authoritative key server 208. The key distribution network is thus bootstrapped with a small number of initial key set ups. Further, as described herein, recursive key server 202 discovers authoritative key server 208 via DNS.

The method may begin by client 204 contacting recursive key server 202 with a request for a symmetric key for use in securing communications with web server 210 at step 212. The request may be secured (e.g., encrypted) using a key derived from $K_{CR}$. (Throughout this disclosure, the phrase "secured using a key derived from key K" means encrypted using K or a key derived from K, e.g., by hashing K or combining K with one or more other keys, or using K to securely share a key that is then used to encrypt or that is used to derive a key that is used to encrypt.) The request, and all communications described herein, may be implemented as communications over the internet using existing protocols.

Next, at step 214, recursive key server 202 contacts authoritative name server 206 with a request for a key server record for web server 210. Such a key server record may be a new type of DNS resource record, which specifies a key server for a given internet-connected entity.

In general, according to some embodiments, a domain name owner may publish one or more authoritative key server resource records in the DNS, in association with the domain name, similar to other DNS record types. According to some embodiments, key server records may have a dedicated DNS resource record type, e.g., "KS", or may be implemented as service records (SRV) or uniform resource identifier (URI) records. Thus, key server records may be implemented using existing DNS record types, with no changes to DNS implementations, or as a new record type.

The key server records may be stored by a name server in the domain that the key server serves, or in a subdomain of that domain. Thus, according to some embodiments, key server records may be published in subdomains, e.g., at _ks._tcp.<domain>.

A name server may return more than one such record, if a domain has more than one key server, and the requester may choose a key server among those returned with a server selection algorithm. A requester may discover the enclosing key server record for a domain by implementing resolution logic at the requester's end, for example, moving from child to parent domains. Such techniques are disclosed in U.S. Pat. No. 9,705,851, filed Jul. 31, 2015, and entitled, "Extending DNSSEC Trust Chains to Objects Outside the DNS", which is hereby incorporated by reference in its entirety. Such logic may also involve determining whether a domain has an associated public key and/or certificate (e.g., via a TLSA record) prior to and/or in addition to searching for a symmetric-key infrastructure key server associated with the domain.

A key server record may specify the domain name of the key server for the identified domain name, and possibly other information about how to connect to it. A domain name may also have hidden key servers that are not published in DNS. Note that a key server record can be associated with more than one domain, e.g., subdomains as well, or possibly an entire zone.

Thus, at step 214, recursive key server 202 requests such a key server DNS resource record from authoritative name server 206. This step can be accomplished as an ordinary DNS lookup, which may involve iteration through the DNS hierarchy (see FIG. 1 and accompanying description). The key server DNS resource record may be authenticated using DNSSEC.

Next, at step 216, authoritative name server 206 returns a key server DNS resource record to recursive key server 202. The response includes information from the key server resource record for web server 210. In particular, the information identifies authoritative key server 208 as a key server for web server 210. The response may be secured (e.g., encrypted) using a key derived from $K_{CR}$.

Next, at step 218, recursive key server 202 contacts authoritative key server 208 to request a shared symmetric key for use with web server 210. This communication may be secured (e.g., encrypted) using a key, denoted $K_{RA}$, shared between recursive key server 202 and authoritative key server 208, or with a key derived from $K_{RA}$.

Key $K_{RA}$ may be established as follows. If recursive key server 202 does not yet share a key with authoritative key server 208, e.g., it has just discovered authoritative key server 208, then recursive key server 202 requests a key from one of authoritative key server's 208 own authoritative key servers. That is, because authoritative key server 208 itself has a domain name, authoritative key server 208 can publish the names of its own key servers in the DNS. Recursive key server 202 may utilize the DNS, traversing the DNS hierarchy if necessary, to locate an authoritative DNS name server that has a key server record for authoritative key server 208. For example, if, on the one hand, recursive key server 202 shares a key with one of authoritative key server's 208 key servers, denoted here as "BKS", then recursive key server 202 can secure a connection with BKS and request a key for authoritative key server 208. For example, for this step in the process, recursive key server 202 and authoritative key server 208, which may not yet share a symmetric key, can temporarily take on the roles of client 204 and web server 210 respectively for the purpose of establishing such a key, via BKS, which can temporarily take on the role of authoritative key server 208. If, on the other hand, recursive key server 202 does not share a key with any of authoritative key server's 208 key servers, then recursive key server 202 can repeat the process with the key servers of each BKS, until it finds a key server in its network, i.e., with which it shares a key. Thus, the key server resolution may utilize DNS resolution to identify key servers for domains and follow the key server graph, which is based on association of key servers with domain names. Such a graph has a directed graph structure, from an origin to a network of key servers. Advantageously, under this approach, recursive key server 202 having a single shared symmetric key with one authoritative key server in the graph of key servers transitively associated with web server 210 is sufficient to get a key for use with authoritative key server 208 (and possibly other key servers as well). It may therefore be assumed for purposes of describing the following steps that recursive key server 202 and authoritative key server 208 already share a symmetric key $K_{RA}$.

Next, at step 220, authoritative key server 208 returns to recursive key server 202 information sufficient for recursive key server 202 to obtain a symmetric key, denoted $K_{CW}$, that client 204 can use to establish a secure connection with web server 210. This information may take one of the following forms, or a combination thereof:

Secure channel: Authoritative key server 208 may generate or otherwise acquire $K_{CW}$, then send $K_{CW}$ to recursive key server 202 via a communication channel secured (e.g., encrypted) using $K_{RA}$ or a key derived from $K_{RA}$.

Key wrapping: Authoritative key server 208 may generate or otherwise acquire $K_{CW}$, then wrap $K_{CW}$ using $K_{RA}$ or a key derived from $K_{RA}$, and send the result to recursive key server 202. Denote "Wrap ($K_1$, $K_2$)" (equivalently, "wrapping $K_1$ using $K_2$") to mean the results of wrapping key $K_1$ using key $K_2$ or a key derived from $K_2$. Here "wrapping" means encrypting or otherwise securing a key in a reversible way using a wrapping key such that the key can be recovered from the results by "unwrapping" with the same wrapping key. Thus, denote $WK_{CWRA}$=Wrap ($K_{CW}$, $K_{RA}$). Authoritative key server 208 may compute $WK_{CWRA}$, then send $WK_{CWRA}$ and optionally an identifier of $K_{RA}$ or other information sufficient to determine $K_{RA}$ to recursive key server 202. Recursive key server 202 then unwraps $WK_{CWRA}$ using $K_{RA}$ or a key derived from $K_{RA}$ to obtain $K_{CW}$.

Key derivation: Authoritative key server 208 may derive $K_{CW}$ from $K_{RA}$ or a key derived from $K_{RA}$, and optional key derivation parameters. Authoritative key server 208 may send any key derivation parameters not implied by prior communications or other context, and optionally an identifier of $K_{RA}$ or other information sufficient to determine $K_{RA}$ to recursive key server 202. In some embodiments here and elsewhere involving key derivation, one entity deriving the key, e.g., authoritative key server 208 here, may not send parameters to another, i.e., key derivation parameters may be implied from context, such as time of day, IP address, and/or domain name. Recursive key server 202 may similarly derive $K_{CW}$ from $K_{RA}$ or a key derived from $K_{RA}$ and optionally the key derivation parameters.

Out of band: Authoritative key server 208 may generate or otherwise acquire $K_{CW}$, such that $K_{CW}$ is associated with an identifier in a separate server, e.g., an external key server, and send the identifier for $K_{CW}$ to recursive key server 202. Recursive key server 202 may then obtain $K_{CW}$ from the separate server.

Next, at step 222, recursive key server 202 returns to client 204 information sufficient for client 204 to obtain the key $K_{CW}$. This information may take one of the following forms, or a combination thereof:

Secure channel: Recursive key server 202 may send $K_{CW}$ to client 204 via a communication channel may be secured (e.g., encrypted) using $K_{CR}$ or a key derived from $K_{CR}$.

Key wrapping: Recursive key server 202 may wrap $K_{CW}$ using $K_{CR}$ or a key derived from $K_{CR}$, and send the result, i.e., $WK_{CWCR}$=Wrap ($K_{CW}$, $K_{CR}$), to client 204. Client 204 may unwrap $WK_{CWCR}$ using $K_{CR}$ or a key derived from $K_{CR}$ to obtain $K_{CW}$.

Out of band: Recursive key server 202 may send an identifier for $K_{CW}$ to client 204. Client 204 may then obtain $K_{CW}$ from a separate server. In general, "out of band" refers to communications using a different channel than that under discussion. In reference to embodiments disclosed herein, "out of band" may refer to email, regular mail, or other electronic protocols.

Inasmuch as $K_{CW}$ is determined by authoritative key server 208 in the foregoing, recursive key server 202 does not have the option of generating $K_{CW}$ again itself at this point by deriving it from $K_{CR}$. For this reason, only three forms of sufficient information (secure channel, key wrapping, and out of band) are described above, but not the fourth (key derivation). However, it is possible in embodiments for authoritative key server 208 to derive $K_{CW}$ from $K_{CR}$ or a key derived from $K_{CR}$, if authoritative key server 208 has access to $K_{CR}$ or a key derived from $K_{CR}$, in which case client 204 may similarly derive $K_{CW}$. It is also possible, as shown in the following, for recursive key server 202 to determine $K_{CW}$ itself in other embodiments, in which case recursive key server 202 may derive $K_{CW}$ from $K_{CR}$ or a key derived from $K_{CR}$.

Finally, at 224, client 204 establishes a secure connection with web server 210 using $K_{CW}$ or a key derived from $K_{CW}$. Again, this means that messages sent between client 204 and web server 210 may be encrypted using $K_{CW}$ or a key derived from $K_{CW}$, or that $K_{CW}$ may be used to securely share a key that is used to encrypt such messages or derive a key that is used to encrypt such messages.

Method 200 may vary according to different embodiments. For example, at step 220, authoritative key server 208 may return more than one response to recursive key server 202, to provide more choices to recursive key server 202 (e.g., involving different previously shared keys, validity periods, key types, algorithm identifiers, key usage restrictions, policies). Recursive key server 202 may choose one such response, or may process more than one such response. At step 222, recursive key server 202 may in turn return more than one response to client 204. Client 204 may likewise choose one such response, or may process more than one such response. Finally, at step 224, client 204 may specify more than one potential key when setting up secure communications with web server 210, thus again providing more choices for negotiation. In addition, to focus the set of possible responses, a requester (e.g., client 204 or recursive key server 202) may indicate its preferences, including which keys it knows and which algorithms it supports, and/or on which entity's behalf it is requesting a key, in its request to a key server (e.g., recursive key server 202 or authoritative key server 208). Entities may also publish such preferences and/or negotiate such capabilities interactively.

III. Web Server Key Arrangements ($K_{CW}$ and $K_{AW}$)

According to some embodiments, web server 210 acquires $K_{CW}$ as follows. At 220, authoritative key server 208 returns to recursive key server 202 information sufficient for web server 210 to obtain $K_{CW}$. At 222, recursive key server 202 forwards this information to client 204. At 224, client 204 then presents this information to web server 210 when establishing a secure connection. This information may take one of the following forms, or a combination thereof:

Secure channel: Authoritative key server 208 may send $K_{CW}$ directly to web server 210 via a communication channel (not shown in FIG. 2) secured (e.g., encrypted) using $K_{AW}$ or a key derived from $K_{AW}$.

Key wrapping: Authoritative key server 208 may wrap $K_{CW}$ using $K_{AW}$ or a key derived from $K_{AW}$ and return the result, i.e., $WK_{CWAW}$=Wrap ($K_{CW}$, $K_{AW}$), and optionally an identifier of $K_{AW}$ or other information sufficient to determine $K_{AW}$, to recursive key server 202 at step 220. Recursive key server 202 then returns $WK_{CWAW}$ to client 204 at step 222. Then, when client 204 initiates a secure connection with web server 210 per step 224, client 204 also presents $WK_{CWAW}$ to web server 210. Because web server 210 has access to $K_{AW}$, web server 210 can unwrap $WK_{CW}$Aw with $K_{AW}$ or a key derived from $K_{AW}$ to recover $K_{CW}$.

Key derivation: Authoritative key server 208 may derive $K_{CW}$ from $K_{AW}$ or a key derived from $K_{AW}$, and optional key derivation parameters. Authoritative key server 208 may return any key derivation parameters not implied by prior communications or other context, and optionally an identifier of $K_{AW}$ or other information sufficient to determine $K_{AW}$ to recursive key server 202 at step 220. Recursive key server 202 may return the optional parameters and identifier to client 204 at step 222, and client 204 may in turn present the optional parameters and identifier to web server 210 at step 224. Because web server 210 has access to $K_{AW}$, web server 210 can derive $K_{CW}$.

Out of band: Authoritative key server 208 may return an identifier for $K_{CW}$ to recursive key server 202 at step 220, such that $K_{CW}$ is associated with the identifier in a server accessible to web server 210. (Authoritative key server 208 is an example of such a server.) Recursive key server 202 may return the identifier to client 204 at step 222, and client 204 may in turn present the identifier to web server 210 at step 224. Web server 210 may access the separate server to recover $K_{CW}$.

All four forms are compatible with authoritative key server 208 generating or otherwise acquiring $K_{CW}$ and wrapping it using $K_{RA}$ or a key derived from $K_{RA}$. All four forms are also compatible with authoritative key server 208 deriving $K_{CW}$ from $K_{RA}$ or a key derived from $K_{RA}$ above. The compatibility with the third form, where authoritative key server 208 derives $K_{CW}$ from both $K_{RA}$ (or a key derived from $K_{RA}$) and $K_{AW}$ (or a key derived from $K_{AW}$), may be realized by putting information derived from a key in the role of a parameter. For example, define $K_{CW}=KDF_1$ ($KDF_2$ ($K_{RA}$, $P_2$), $KDF_3$ ($K_{AW}$, $P_3$), $P_1$) where $KDF_1$, $KDF_2$, and $KDF_3$ denote key derivation functions, and $P_1$, $P_2$, and $P_3$ are optional parameters. Then $K_{CW}$ is derived from both $K_{RA}$ and $K_{AW}$. Now define $DK_{RA2}=KDF_2$ ($K_{RA}$, $P_2$) and $DK_{AW3}=KDF_3$ ($K_{AW}$, $P_3$). Then from the perspective of authoritative key server 208 setting up $K_{CW}$ at recursive key server 202, $K_{CW}$ is derived from $K_{RA}$ with parameters $P_2$, $DK_{AW3}$ and $P_1$: $K_{CW}=KDF_1$ ($KDF_2$ ($K_{RA}$, $P_2$), $DK_{AW3}$, $P_1$). However, from the perspective of authoritative key server 208 setting up $K_{CW}$ at web server 210, $K_{CW}$ is derived from $K_{AW}$ with parameters $DK_{RA2}$, $P_3$ and $P_1$: $K_{CW}=KDF_1$ ($DK_{RA2}$, $KDF_3$ ($K_{AW}$, $P_3$), $P_1$). Therefore, recursive key server 208 and web server 210 may each derive $K_{CW}$ itself based on a shared key ($K_{RA}$ vs. $K_{AW}$ respectively) and key derivation parameters ($P_2$, $DK_{AW3}$ and $P_1$ vs. $DK_{RA2}$, $P_3$ and $P_1$ respectively). Note that given access to the parameters $DK_{AW3}$, $DK_{RA2}$ and $P_1$, an adversary may also be able to derive $K_{CW}$. Therefore, at least one of these parameters, when conveyed between entities in FIG. 2, may be conveyed over a secure channel or otherwise protected from disclosure. For example, $DK_{AW3}$ may be conveyed over a secure channel from authoritative key server 208 to recursive key server 202.

An advantage to these approaches of providing web server 210 with shared key $K_{CW}$ is that authoritative key server 208 and web server 210 do not need to store copies of multiple keys, i.e., separate keys $K_{CW}$ shared with each client; $K_{AW}$ alone is sufficient, and $K_{AW}$ may be stored in a tamper-resistant hardware cryptographic module.

According to some embodiments, at the outset, web server 210 and authoritative key server 208 establish a symmetric key $K_{AW}$ for securing a communication between them as follows. Web server 210 obtains a shared symmetric key for use with authoritative key server 208 via the network of other key servers, e.g., starting with its own recursive key server, with web server 210 and authoritative key server 208 effectively taking the roles of client 204 and web server 210 respectively according to the key establishment steps previously described. Web server 210 initiates a secure connection with authoritative key server 208 using the shared symmetric key. Web server 210 and authoritative key server 208 may also authenticate one another via non-symmetric-key methods (for example, certificates, hash-based signatures) such that key servers only need to be trusted for confidentiality, not authentication. Web server 210 then provisions one or more key wrapping keys (e.g., $K_{AW}$) for use by authoritative key server 208 in responding to requests for shared symmetric keys for web server 210. Web server 210 also optionally performs other key management operations over the secure connection.

Web server 210 may "bootstrap" the process just described via a key established out of band with a key server, from which it obtains keys for other key servers, ultimately reaching authoritative key server 208. Such other key servers may also include key servers operated by hardware vendors, network operators, software suppliers, application providers, devices, and users with which web server 210 has an initial relationship. As further examples, key servers involved in establishing keys may be operated by certification authorities, identity providers, domain name registrars or registries, address registrars or registries, DNS providers, web hosting providers, cloud service providers, security service providers, search engines, voice assistant services, or more generally any entity with which another entity may have a sufficiently trusted technical or business relationship. Client 204 may similarly bootstrap its key establishment with recursive key server 202 via such initial relationships of its own, and may similarly establish and manage its relationship with recursive key server 202 by the process just described for web server's 210 interaction with authoritative name server 208. Furthermore, in embodiments, recursive key server 202 and authoritative name server 208 may bootstrap, establish, and manage their relationship by similar means.

Another technique for establishing $K_{AW}$ with web server 210 and authoritative key server 208 is disclosed below in Section VIII.

IV. Keys for Multiple Clients

Note that some embodiments secure communications between client 204 and web server 210 by encrypting such communications using a key generated, derived, or otherwise acquired by recursive key server 202 rather than by authoritative key server 208. More generally, such embodiments may include recursive key server 202 setting up shared symmetric keys for multiple clients (for securing communications with web server 210) without needing to contact authoritative key server 208 each time. The method of FIG. 2 may be modified as follows to achieve these and other advantages.

Rather than a client-specific key $K_{CW}$, authoritative key server 208 generates, derives, or otherwise acquires a recursive key server-specific key $K_{RW}$ at step 220. Authoritative key server 208 then returns to recursive key server 202 information sufficient for recursive key server 202 to obtain $K_{RW}$ at step 220. Following the various forms above, authoritative key server 208 may return $K_{RW}$ over a secure channel; may wrap $K_{RW}$ using $K_{RA}$, or a key derived from $K_{RA}$, and return the wrapped key $WK_{RWRA}=Wrap$ ($K_{RW}$, $K_{RA}$) and optionally an identifier of $K_{RA}$ or other information sufficient to determine $K_{RA}$; may derive $K_{RW}$ from $K_{RA}$ or a key derived from $K_{RA}$ and optional key derivation parameters, and return any key derivation parameters not implied by prior communications or other context, and optionally an identifier of $K_{RA}$ or other information sufficient to determine $K_{RA}$; or may return an identifier associated with $K_{RW}$, whereby recursive key server 202 obtains $K_{RW}$ out of band. In addition, in each of these forms, authoritative key server 208 returns to recursive key server 202 information sufficient for web server 210 to obtain $K_{RW}$.

Recursive key server 202 generates, derives, or otherwise acquires $K_{CW}$ itself then returns to client 204 information sufficient for client 204 to obtain $K_{CW}$ at step 222. Following the various forms above again, recursive key server 202 may return $K_{CW}$ over a secure channel; may wrap $K_{CW}$ using $K_{CR}$ or a key derived from $K_{CR}$ and return the wrapped key $WK_{CWCR}$=Wrap ($K_{CW}$, $K_{CR}$) and optionally an identifier of $K_{CR}$ or other information sufficient to determine $K_{CR}$; may derive $K_{RW}$ from $K_{CR}$ or a key derived from $K_{CR}$ and optional key derivation parameters, and return any key derivation parameters not implied by prior communications or other context, and optionally an identifier of $K_{CR}$ or other information sufficient to determine $K_{CR}$; or may return an identifier associated with $K_{RW}$, whereby client 204 obtains $K_{CW}$ out of band.

In addition, recursive key server 202 returns to client 204 information sufficient for web server 210 to obtain $K_{CW}$. This information may include the previous information sufficient for web server 210 to obtain $K_{RW}$ and additional information sufficient for web server 210 to obtain $K_{CW}$ given $K_{RW}$. Once again following the various forms, recursive key server 202 may wrap $K_{CW}$ using $K_{RW}$ or a key derived from $K_{RW}$ and return as the additional information the wrapped key $WK_{CWRW}$=Wrap ($K_{CW}$, $K_{RW}$) and optionally an identifier of $K_{RW}$ or other information sufficient to determine $K_{RW}$; may derive $K_{CW}$ from $K_{RW}$ and optional key derivation parameters, and return any key derivation parameters not implied by prior communications or other context, and optionally an identifier of $K_{RW}$ or other information sufficient to determine $K_{RW}$; or may return an identifier associated with $K_{CW}$, such that web server 210 obtains $K_{CW}$ out of band. Recursive key server 202 may derive $K_{CW}$ from both $K_{CR}$ and $K_{RW}$ by putting information derived from a key in the role of a parameter as described above in Section III.

When client 204 initiates a secure connection with web server 210 (step 224), client 204 presents information sufficient for web server 210 to obtain $K_{CW}$. Because web server 210 has access to $K_{AW}$, web server 210 can recover $K_{CW}$ by unwrapping, deriving, and/or accessing keys out of band as appropriate.

According to an embodiment, recursive key server 202 can cache $K_{RW}$ and information sufficient for web server 210 to obtain $K_{RW}$ and use them for requests for the same web server 210 from other clients. Recursive key server 202 may contact authoritative key server 208 for new web servers, or when the cache entry expires, similar to DNS. According to this approach, each client may still get its own $K_{CW}$ and information sufficient for web server 210 to obtain $K_{CW}$.

In both the basic symmetric-key infrastructure approach and the approach for multiple clients, recursive key server 202 provides to client 204 (a) information sufficient for client 204 to obtain a key $K_{CW}$ and (b) information sufficient for web server 210 to obtain the same key $K_{CW}$. Authoritative key server 208 provides to recursive key server 202, in generalized form, information sufficient for recursive key server 202 to construct the information for (a) and (b) above. Embodiments vary in terms of the use of secure communications, wrapping, derivation, and/or out-of-band access, and in terms of whether authoritative key server 208 or recursive key server 204 initially generates or otherwise acquires $K_{CW}$. Furthermore, in some embodiments, one or more such information may not be sent explicitly, e.g., in embodiments key derivation parameters may be implied from context. The embodiments described may be considered non-limiting examples of the generalized form.

V. Multiple Key Servers for Enhanced Privacy

With symmetric-key infrastructures in general, when a key server generates a symmetric key for a client, it can also decrypt traffic associated with the key. This means that a person with full access to a key server can eavesdrop on communications secured by keys produced by the key server. Therefore, for additional assurance, according to some embodiments, the client can request keys from multiple recursive key servers and then combine the keys, e.g., by a key derivation technique, concatenation, exclusive-or (XOR), or other arithmetic or logical operations. The resulting combined key may then be used to secure communications, e.g., with a web server.

Following the generalized form above, the i-th recursive key server 202 may provide to client 204 information sufficient for client 204 to obtain a component key $K_{CW(i)}$ and for web server 210 to obtain the same key $K_{CW(i)}$. Client 204 may construct a combined key from component keys $K_{CW}^{(1)}$, $K_{CW}^{(2)}$, etc. Client 204 may also present to web server 210 the information from the various recursive key servers 202 sufficient for web server 210 to obtain the various component keys $K_{CW}^{(1)}$, $K_{CW}^{(2)}$, ..., e.g., multiple wrapped keys and/or multiple key derivation parameters, as examples without limitation, to the web server with which it wants to securely communicate, and signal that the connection is to be secured based on two or more of them, rather than on a single key. Client 204 may also provide information on how to combine the component keys to form a combined key; this all together may form the information sufficient for web server 210 to obtain the symmetric key. According to such embodiments, a single recursive key server would then be unable to decrypt associated traffic on its own. According to some embodiments, a recursive key server 202 can similarly request and combine keys from multiple authoritative key servers, and then return to client 204 information sufficient for client 204 to obtain the combined key, and information sufficient for web server 210 to do the same, which may include a combination of the various forms of information described in Section III above.

VI. Key Server Referrals & Peering

Similar to DNS referrals from one authoritative name server (e.g., authoritative name server 206) to another, an authoritative key server (e.g., authoritative key server 208) may refer a requester to another authoritative key server. The response may include a domain name of another authoritative key server, and may also include a wrapped key for connecting to the other key server. Note that such referrals may be helpful when the authoritative key server is associated with multiple domains. Referrals can also reference hidden key servers not published in the DNS.

Recursive key servers (e.g., recursive key server 202) can also contact other recursive key servers to obtain keys on their behalf in a "peering" process. Such peering may helpful when one recursive key server has access to authoritative key servers that another recursive key server does not, e.g., peers may specialize in keys for specific classes of domains.

VII. Key Derivation, Wrapping, Provenance, and Updates

Key derivation and key wrapping can follow conventional approaches, e.g., Krawczyk's HKDF key derivation technique as described in Internet Engineering Task Force RFC 5869 (which may involve separate extraction and expansion functions), and the suite of Advanced Encryption Standard (AES) techniques for key wrapping, respectively. Regardless of the choices of key derivation and key wrapping techniques, such techniques may generate keys that include various parameters, e.g., so as to specify any, or a combination, of key generation method, key origin, key server name, web server name, client identifier, counter, nonce, validity period, key identifier, key type, algorithm identifier, key usage restrictions, or policies. In key wrapping, some parameters may be wrapped along with the key for confidentiality, if supported by the key wrapping technique. Including such parameters in can also provide provenance for the various keys, e.g., the web server can determine information about the origin and management of the keys presented to it, including the identity of the path through the key server graph, to decide whether to continue the connection accordingly.

Various entities, such as recursive and/or authoritative key servers, may set and enforce policies that govern key derivation. An example of such a policy states that keys must be derived from multiple entities' contributions. A web server and/or key server may refuse connections that require keys that do not meet such policies. Recursive key servers may offer policy-specific services, and a client may choose a recursive key server and/or specify requests according to the client's preferred policy. Examples of such arrangements are disclosed in U.S. patent application Ser. No. 14/627,506, filed Feb. 20, 2015, and entitled, "Balancing Visibility in DNS", which is hereby incorporated by reference in its entirety. Policies may also specify constraints on locations of key servers, relationships (e.g., independence from a specified entity or entities), and other attributes. Thus, a client's key server selection may be based on policy as well as performance (latency, availability, etc.).

Keys may be updated (e.g., replaced) based on their probable frequencies of use and on security considerations. In general, "operational" keys generated by key servers in response to requests can have a short validity period (e.g., measured in minutes or hours, less than one day) and then expire. This reduces potential exposure and simplifies key management because such keys are essentially continually refreshed. "Infrastructure" keys established initially between entities, e.g., between a client and its recursive key server, or between a web server and its authoritative key server, may have a relatively longer validity period, in days, or weeks, in some cases. However, such keys can also be refreshed, via a policy requiring a new key to be obtained periodically over a secure connection. Keys can also be updated in place in some implementations, e.g., via key derivation of a new key from an old one. Initial setup operations can also be applied again to manage and/or change keys.

VIII. Symmetric Key Pairs

In the foregoing, each entity may store certain symmetric keys that it shares with other entities for a time period spanning multiple transactions, e.g., client 204 and recursive key server 202 each store $K_{CR}$, recursive key server 202 and authoritative key server 208 each store $K_{RA}$, and authoritative key server 208 and web server 210 each store $K_{AW}$. Certain other symmetric keys may only be held within a transaction (e.g., for the duration of the transaction, as required for the transaction, or until used by the transaction). For example, client 204, recursive key server 202, authoritative key server 208 and web server may each hold $K_{CW}$ within a transaction, the key may not need to be stored for multiple transactions because it can be obtained from the other stored keys, and from information on how to obtain the key from the other stored keys.

In implementations where one entity shares keys with a large number of other entities, e.g., where recursive key server 202 interacts with many clients 204, where authoritative key server 208 interacts with many recursive key servers 202 (or vice versa), and/or where authoritative key server interacts with many web servers 210, it may not be practical for the entity to store all of the symmetric keys that it shares in an efficient and secure manner. In such situations, an alternative is for the entity to provide to a corresponding entity information sufficient to obtain a shared symmetric key from a symmetric key that the entity does store (and which may not be a shared key, i.e., it may be local to the entity). For example, recursive key server 202 may provide to client 204 a wrapped key $WK_{CRRR}=\text{Wrap}(K_{CR}, K_{RR})$, where $K_{CR}$ is a symmetric key shared between the entities and $K_{RR}$ is a symmetric key local to recursive key server 202. When establishing a secure communication with recursive key server 202, client 204 may present, in addition to other information, the wrapped key $WK_{CRRR}$. Notably, recursive key server may be able to obtain a specific client's $K_{CR}$ from $WK_{CRRR}$ and would not need to store $K_{CR}$ for every client, only the local key $K_{RR}$. Similar arrangements may be made between recursive key server 202 and authoritative key server 208, based on wrapped keys $WK_{RARR}=\text{Wrap}(K_{RA}, K_{RR})$ and/or $WK_{RAAA}=\text{Wrap}(K_{RA}, K_{AA})$; and between authoritative key server 208 and web server 210, based on wrapped keys $WK_{AWAA}=\text{Wrap}(K_{AW}, K_{AA})$ and/or $WK_{AWWW}=\text{Wrap}(K_{AW}, K_{WW})$. Alternatively, instead of wrapping, the key management can be optimized through key derivation. For example, recursive key server 202 may derive $K_{CR}$ from local key $K_{RR}$ and key derivation parameters, and provide the key derivation parameters to client 204, rather than storing $K_{CR}$. Client 204 may then present the key derivation parameters (if not already implied by prior communications or other context) when establishing secure communication with recursive key server 202. The examples for other entities are similar.

When two wrapped keys such as $WK_{AWAA}=\text{Wrap}(K_{AW}, K_{AA})$ and $WK_{AWWW}=\text{Wrap}(K_{AW}, K_{WW})$ are prepared, the combination may be considered a "symmetric key pair." Symmetric key pairs as disclosed may be used to establish $K_{AW}$ with web server 210 and authoritative key server 208 as follows. In general, a domain name owner may provide a symmetric key pair as a "hint" along with a key server record. For example, web server 210 may publish $WK_{AWAA}$ and $WK_{AWWW}$ in conjunction with a key server record for authoritative key server 208. Authoritative key server 208 would not need to look up, or even store, $K_{AW}$. Instead, a requester such as client 204 or recursive name server 202 may present $WK_{AWAA}$, and authoritative key server 208 may unwrap it with local key $K_{AA}$ to get $K_{AW}$. Authoritative key server 208 may also forward $WK_{AWWW}$ to the requester, if the requester does not already have it from the hint. This value may eventually be presented to web server 210 by the requester, so that web server 210 may unwrap it with local key $K_{WW}$ and would not need to look up or store $K_{AW}$.

IX. Example Implementation Hardware and Data Structures

Figure 3:
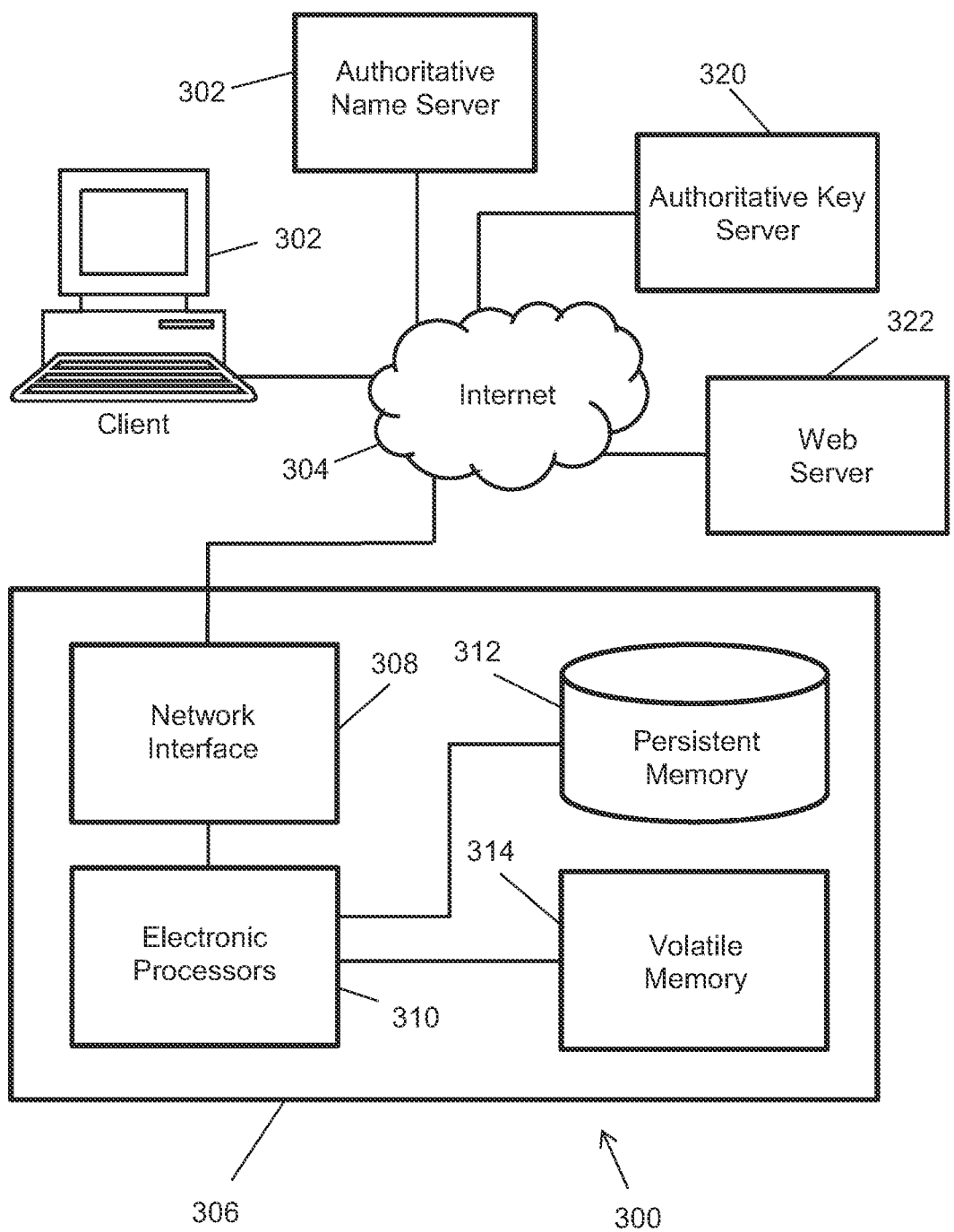
FIG. 3 is a schematic diagram of a system suitable for implementing methods according to some embodiments.

FIG. 3 is a schematic diagram of a system 300 suitable for implementing methods according to some embodiments. System 300 may be based around an electronic hardware internet server computer 306, which may be communicatively coupled to the internet 304. Server computer 306 includes network interface 308 to effect the communicative coupling to the internet 304. Network interface 308 may include a physical network interface, such as a network adapter. Server computer 306 may be a special-purpose computer, adapted for reliability and high-bandwidth communications. Thus, server computer 306 may be embodied in a cluster of individual hardware server computers, for example. Alternately, or in addition, server computer 306 may include redundant power supplies. Persistent memory 312 may be in a Redundant Array of Inexpensive Disk drives (RAID) configuration for added reliability, and volatile memory 314 may be or include Error-Correcting Code (ECC) memory hardware devices. Server computer 306 further includes one or more electronic processors 310, which may be multi-core processors suitable for handling large amounts of information. Electronic processors 310 are communicatively coupled to volatile memory 314. Electronic processors 310 are also communicatively coupled to persistent memory 312, and may execute instructions stored thereon to effectuate the techniques disclosed herein, e.g., the techniques shown and described in reference to FIGS. 2, 4, 5, and 6. In particular, server computer 306 may embody a recursive key server such as recursive key server 202 of FIG. 2, an authoritative name server such as authoritative name server 406 or 506, an authoritative key server such as authoritative key server 408 or 509, or a provisioning server, such as the provisioning server of provisioning system 512. Server computer 306 is further communicatively coupled to DNS authoritative name server 302, authoritative key server 320, web server 322, and client computer 302 through internet 304, such that it may effectuate the disclosed techniques.

Some embodiments utilize hardware cryptographic modules. Such cryptographic modules may securely store one or more keys and securely implement key operations such as encryption, decryption, key derivation, key wrapping, and key unwrapping. They may be removably communicatively coupled to hardware computers, e.g., by insertion into an expansion slot. They may be compliant with Federal Information Processing Standards, Publication 140-2, "Security Requirements for Cryptographic Modules" (a.k.a., "FIPS PUB 140-2"). They may have tamper resistant and/or tamper evident properties.

Key servers such as recursive key server 202 and authoritative key server 208 may include a special-purpose DNS interface, e.g., DNS over HTTPS, with JSON encoding of responses, that responds only to specially defined key requests, and leverages existing and emerging functionality. Alternatively, a new DNS record type (e.g., a "K" record) may be defined for compatibility with existing encodings. The record may include information sufficient for a requester to obtain, and information for a server to obtain, a shared symmetric key, as well as other parameters such as a key identifier, a key type, an algorithm identifier, a priority, and a time to live (TTL). The information sufficient for the requester and/or the server to obtain the symmetric key may include a data structure with fields such a wrapped key, key derivation parameters, and identifiers for other keys involved in wrapping and/or derivation. Alternatively, the information may include a programming script with instructions for constructing the key. As another alternative, the information may include one or more DNS records of the new key record type, each record indicating how to construct a key from one or more other keys, e.g., through unwrapping, derivation, extraction, expansion, concatenation, and/or other combination. Following the DNS protocol, some key records may be returned in the "answer" section and others in the "additional" section of a DNS response. A key server may indicate to a requester, explicitly or implicitly, which such key records will enable the requester to construct a targeted key, and which such key records will enable another entity, e.g., a web server, to construct the same key. For example, a "K" record may include a key identifier or a reference to another "K" record. The requester may then forward the latter such records to the other entity. A requester may combine data structures, scripts, and/or DNS records received from more than one key server, and add further fields, instructions, and/or DNS records to form new information for constructing a combined key. A key server may return more than one response by returning more than one record, consistent with the DNS protocol. A requester may also indicate its preferences and policies in an Extension Mechanisms for DNS (EDNS) extension. Key servers so equipped are compatible with the combined key server and name server embodiments described below in Section XI.

Connections to key servers and web servers may be secured using transport layer security (TLS) pre-shared keys, with a new profile using wrapped or derived keys. The information sufficient for the server to obtain the pre-shared key may thus be provided, in some form, as the "identity" for the pre-shared key in the TLS handshake. Such an arrangement does not affect the TLS protocol, only key management, and its impact can be limited to implementations of the handshake portion of the TLS protocol, which may be separate from an implementation of the record portion that secures ongoing communications.

X. Key Pre-Generation and Wrapping

To reduce risk of compromise of keys used for wrapping, e.g., $K_{AW}$, a key server provisioning system may pre-generate a set of symmetric keys, e.g., $K_{XW}^{(1)}, \ldots, K_{XW}^{(N)}$, where X may be R (for sharing with a recursive key server) or C (for sharing with a client), pre-wrap them, $K_{XWAW}^{(1)}, \ldots, K_{XWAW}^{(N)}$, using $K_{AW}$, and provision them to a key server, instead of sending a copy of $K_{AW}$. Such a key server provisioning system may be implemented as a separate internet-connected computer, e.g., as a web service. If the key server so provisioned is compromised, only keys already provisioned may be reported and/or revoked. Such a key server may thus be set up such that it cannot generate additional wrapped keys $K_{XWAW}^{(1)}, \ldots, K_{XWAW}^{(N)}$ itself, and must therefore rely on the key server provisioning system, yet can respond to a limited number of requests from recursive key servers and/or clients with keys and associated wrapped keys. Alternatively, instead of wrapping, the key management can be optimized through key derivation. In this case, the key server provisioning system may pre-generate the symmetric keys by deriving them from $K_{AW}$ and key derivation parameters, and provision the key derivation parameters and the derived keys to the key server. The key server can then respond to a limited number of requests with derived keys and associated key derivation parameters. With these approaches, because $K_{AW}$ itself is not provided to the key server, the key server and the provisioning system may share a different symmetric key for use in securing their communications.

Each key server of a web server may be given its own shared symmetric key to use on behalf of a particular web server. Such an arrangement may be set up by a web server with each key server directly, or with groups of related key servers, where a provisioning system for a group is given a separate key, and in turn establishes keys for servers within the group via an additional level of keys, e.g., with additional key wrapping and/or key derivation.

XI. Other Modification and Variations

The symmetric-key infrastructure disclosed herein relates to traffic encryption (and integrity protection) and associated key management. Entities are effectively authenticated transitively by a network of key servers, to the extent they are identified and authenticated at all. However, key servers can in principle impersonate entities they share a symmetric key with, hence the benefit of combining keys from multiple key servers as described above in Section V, above. If additional assurance is needed, identity management, authentication, authorization, certification, etc., can be handled by digital signatures, e.g., hash-based signatures in a post-quantum setting, which are not necessarily part of a symmetric-key infrastructure. For example, web servers and key servers (and even clients) can have conventional public-key certificates, associating their identity with a digital signature public key. Entities can then authenticate key set up and transactions with a hash-based digital signature. This can help protect against "man-in-the-middle" attacks and key server compromise. Furthermore, although the methods described herein are motivated by the potential risks in conventional public-key cryptosystems, the methods may nevertheless be combined with conventional or newer forms of public-key cryptosystems. For example, secure connections among entities may be established using a shared symmetric key in combination with public-key cryptosystems methods such as those that provide forward secrecy, or as an additional layer to public-key cryptosystems methods.

According to some embodiments, key server and DNS name server functionality may be combined in one integrated system. Such a combination may simplify interfaces, among other advantages. For example, recursive DNS server 116 may be extended to accept requests for keys as disclosed herein, so that a client computer may ask for both a key and the IP address of a particular web server at the same time. Recursive DNS server 116 may thus embody the functionality of recursive key server 202. Authoritative DNS server 106 may likewise be extended to accept requests for keys as disclosed herein and may thus embody the functionality of authoritative key server 208. Combining functionality may make it easier to add key server functionality into existing DNS implementations.

According to some embodiments, client 204 interacts directly with authoritative key server 208 instead of via recursive key server 202. In such embodiments, the communications 212, 222 between client 204 and recursive key server 202 are omitted or internal to client 204, the communications 218, 220 between recursive key server 202 and authoritative key server 208 are instead between client 204 and authoritative key server 208, and the communications 214, 216 between recursive key server 202 and authoritative name server 206 are instead between client 204 and authoritative name server 206. Furthermore, according to some embodiments, web server 210 may take the role of recursive key server 202 and/or interact with authoritative name servers 206, authoritative key servers 208 and/or one or more other recursive key servers on behalf of client 204. Such an approach may be advantageous as web server 210 may prefetch information sufficient for client 204 to establish a symmetric key with another web server linked from a web page presented by web server 210, thereby potentially reducing latency compared to client 204 obtaining the key only after receiving the web page.

Part B: Enhancements to the Embodiments of Part A and Additional Embodiments

Part B shows and describes various enhancements to the embodiments shown and describes in Part A, as well as discloses additional embodiments.

XII. Introduction

Part A focused on post-quantum cryptography, that is, cryptography in a world in which existing public-key cryptosystems are no longer secure. Embodiments shown and disclosed in Part B may be practiced in such an environment, but are also useful in an environment where some public-key cryptosystems are available and secure. A statement of some problems solved by some embodiments disclosed in Part B follows.

Some embodiments disclosed in this part address and overcome issues raised by the following two questions. First, how can client computers and servers maintain the security of present communications if conventional public-key cryptosystems are compromised in the future? As presented above in Part A, conventional cryptosystems, such as RSA, Diffie-Hellman, elliptic curve, etc., are potentially at risk due to cryptanalytic advances and/or quantum computing. Second, if new public-key cryptosystems are not yet available, how can client computers and servers set up secure connections? Existing approaches are insufficient. For example, non-conventional public-key cryptosystems thought to be immune from quantum computer advances (e.g., based on lattices, etc.) are not yet well enough established to be implemented in practice. As another example, hash-based signatures, while thought to be not at risk, only support authentication. As yet another example, symmetric-key cryptosystems are generally inoperable at internet scale, Kerberos-style approaches were originally designed for enterprise scale, whereas internet-scale extensions assume public-key cryptosystems exist. The problems raised above may be solved using embodiments disclosed herein.

Embodiments as disclosed in Part A at least partially solve these problems using DNS-based symmetric key infrastructure. In general, and by way of explanation rather than limitation, such embodiments may operate as follows to provide a client computer and a web server with a symmetric key for use with (e.g., encrypting) communications between them. In general, the client obtains a shared symmetric key for use with a web server via network of key servers. The web server publishes the names of its authoritative key servers (and related information) in the DNS. The recursive key servers interact with one or more authoritative key servers on the client's behalf, or client may interact with them directly. The client and web server secure connections based on the shared symmetric key, in combination with a public-key cryptosystem, if available. Such embodiments address both questions presented above. First, if conventional public-key cryptosystems are compromised, present communications are still protected due to use of shared symmetric keys. Second, if new public-key cryptosystems not available, secure connections can still be set up via established shared symmetric keys. Some embodiments leverage the availability of public-key cryptosystems today, to establish shared symmetric keys for use both now and in future.

Part A primarily (though not exclusively) focuses on the potential long-term scenario where public-key cryptosystems are no longer available, and provides symmetric-key only solutions that may be deployed instead. Part B focuses on the near-term scenario, where public-key cryptosystems are available and shared symmetric keys are employed as a second factor for additional security, in an increasing number of settings, as well as the potential long-term scenario. In such embodiments, even if only public-key cryptography protects interactions with the authoritative key server initially, it is still beneficial to have a shared symmetric key with the web server. Over time, the symmetric keys may be shared with more components, thus preparing for the long-term scenario. Further, embodiments of Part B may support emerging industry specifications for adding External Pre- Shared Keys (PSKs) to various security protocols such as "TLS 1.3 Extension for Certificate-based Authentication with an External Pre-Shared Key", available at datatracker.ietf.org/doc/draft-housley-tls-tls13-cert-with-extern-psk, and "Using Pre-Shared Key (PSK) in the Cryptographic Message Syntax (CMS)", available at datatracker.ietf.org/doc/draft-ietf-lamps-cms-mix-with-psk. Currently, there is no industry standard way to distribute or manage external PSKs for these extensions or in general for other security protocols. Embodiments of Part B can address this gap.

Embodiments of Part B may utilize specialized data structures in order to establish shared symmetric keys. Such data structures include Symmetric Key Information Objects (SKIO) and Symmetric Key Information Production Objects (SKIPO). These data structures are briefly described presently, and described in detail below in Sections XXV and XXVI.

SKIOs are a form of symmetric key establishment information. As considered herein, such information is sufficient for a requester (such as a client 204, 404) and/or a correspondent (such as a web server 206, 406) to obtain a shared symmetric key. SKIOs provide a flexible approach, in that they may specify how to obtain a shared symmetric key based on other shared symmetric keys (e.g., by deriving and/or wrapping), and/or by looking up in a key repository. SKIOs provide an example of this capability: one SKIO allows the requester to obtain a shared symmetric key, and another SKIO, which may be the same or different, allows the correspondent to do same. A SKIO data structure is recursive: other keys may be represented as subordinate SKIOs. Thus, SKIOs provide information on how to obtain a symmetric key, e.g., given knowledge of other symmetric keys and/or access to out of band information.

SKIPOs are a form of symmetric key production record. As considered herein, such a record provides information on how to produce key establishment information (e.g., a SKIO). SKIPOs provide a flexible approach, in that they specify how to produce key establishment information based on other shared symmetric keys, by looking up and/or storing in a key repository, by exporting from a shared context, and/or by interacting with an authoritative key server. A web server, for example, may publish multiple key production records that a recursive key server or client can choose among, reflecting different types of symmetric keys produced, production approaches, authoritative key servers, etc. Similar to SKIOs, a SKIPO data structure is recursive in that it may include subordinate SKIPOs providing information on how to prepare SKIOs for other symmetric keys.

According to some embodiments and as explained in detail herein, a SKIPO provides information on how to prepare a SKIO for a designated correspondent and how to obtain the associated symmetric key.

XIII. Enhanced Embodiments of FIG. 2

Symmetric key establishment information (e.g., SKIOs) and symmetric key production records (e.g., SKIPOs) may be used to enhance embodiments according to FIG. 2. A description of using such information and records in reference to FIG. 2 follows. In the following description, the entities depicted in FIG. 2 are as described above in Part A. However, their interactions to establish a shared symmetric key between client 204 and web server 210 may differ, as explained presently.

At 212, client 204 contacts recursive key server 202 to request key establishment information (e.g., a SKIO) for use with web server 210.

At 214, recursive key server 202 contacts DNS authoritative name server 206 to request a key production record (e.g., a SKIPO) for web server 210.

At 216, authoritative name server 206 returns a key production record, which points to authoritative key server 208, e.g., by including a URI for authoritative key server 208.

At 218, recursive key server 202 contacts authoritative key server 208 to request key establishment information for use with web server 210.

At 220, authoritative key server 208 responds to the request by producing and returning key establishment information to recursive key server 202.

At 222, recursive key server 202 returns the key establishment information, or information sufficient to derive the key establishment information, to client 204.

Subsequently, at 224, client 204 initiates a secure connection with web server 210 using the key establishment information.

In the enhanced embodiments of FIG. 2, the various entities may have cryptographic prerequisites. That is, to participate in the enhanced method shown and described directly above, the following may be established beforehand. Client 204 and recursive key server 202 may have established a secure connection; that is, may have a shared symmetric key. However, if they use a public-key cryptosystem today, they do not need to have previously established a shared symmetric key. However, they can enhance connection security if they also use a shared symmetric key. They can also determine a shared symmetric key $K_{CR}$ for use in exchanging other keys, either from a secure connection, or out of band.

Further, web server 210 and authoritative key server 208 have previously established a shared symmetric key, $K_{AW}$. They may establish $K_{AW}$ over a secure connection, which again can be set up with public-key cryptosystem, a separately established symmetric key, or both. Alternatively, they can establish $K_{AW}$ out of band. Web server 210 and authoritative key server 208 can use $K_{AW}$ for exchanging other keys.

XIV. Direct Client Interactions with an Authoritative Key Server

Relaxation of cryptographic requirements compared to some embodiments of Part A make it more feasible for a client to secure a connection with an authoritative key server, because previously shared symmetric key is not needed (today). A direct client interaction with an authoritative key server is thus a viable alternative to the embodiments of FIG. 2, in both Part A and Part B. A client that wants a shared symmetric key with an authoritative key server can obtain one via one of the authoritative key server's own authoritative key servers, following a key server graph as described above in Part A.

Figure 4:
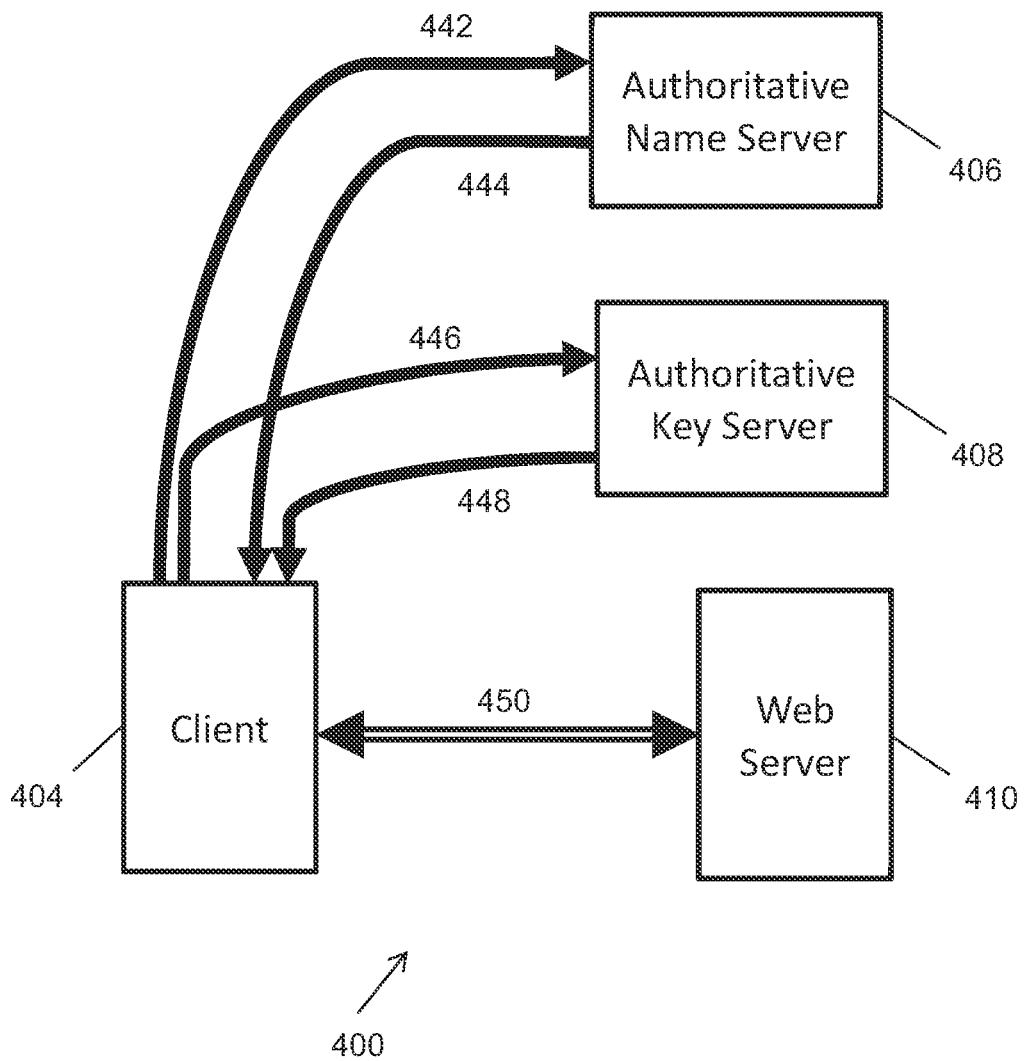
FIG. 4 is a hybrid diagram of a system for and method of direct client interaction with an authoritative key server for implementing symmetric-key infrastructure according to some embodiments.

FIG. 4 is a hybrid diagram 400 of a system for and method of direct client interaction with an authoritative key server for implementing a symmetric-key infrastructure according to some embodiments. The entities shown in FIG. 4 may be the same entities (without the recursive key server) shown in FIG. 2. Such entities may have the following cryptographic prerequisites. Client 404 and authoritative key server 408 may have established a secure connection. Similar to the embodiments of FIG. 2 described above in Part B, Section XIII, if they use a public-key cryptosystem today, they don't need to have previously established a shared symmetric key, but they can use, or additionally use, a separate symmetric key if they have one. Also similar to the embodiments of FIG. 2 described in Part A, e.g., Section II, they can either determine shared symmetric key $K_{CA}$ from a secure connection or out of band, and use this key to exchange other keys. The shared symmetric key $K_{CA}$ in this direct interaction would be comparable to the shared symmetric key $K_{RA}$ in the interaction between the recursive key server and the authoritative key server. Web server 410 and authoritative key server have previously established a shared symmetric key $K_{AW}$, as in the embodiments of FIG. 2 described above in Part B, Section VIII, for use in exchanging other keys. Authoritative name server 406 may protect the authenticity and integrity of the key production record via DNSSEC and/or a secure connection with client 404. The latter may also enhance privacy of this exchange.

At 442, client 404 contacts authoritative name server to request a key production record for web server 410. This may be part of a DNS lookup, which may involve iteration through the DNS hierarchy. The DNS record may be authenticated with DNSSEC. The connection may or may not be secured.

At 444, authoritative name server 406 returns a key production record (e.g., a SKIPO), pointing to (e.g., including a URI for) authoritative key server 408. This may include other information on how to produce key establishment information for use with web server 410. Further, it may return multiple records that client 404 can choose among.

Alternatively, steps 442 and 444 can be done via a recursive name server, like ordinary DNS requests. Client 404 need not do this part directly.

At 446, client 404 contacts authoritative key server 408 to request key establishment information for use with web server 410. The connection may be secured with a public-key cryptosystem and/or a shared symmetric key.

At 448, authoritative key server 408 produces and returns key establishment information (e.g., a SKIO). In some embodiments, authoritative key server 408 may translate an existing key provided by client 404 into the key establishment information. The connection may be secured with a public-key cryptosystem and/or a shared symmetric key. The client-related portion of the key establishment information may be secured with a symmetric key (e.g., $K_{CA}$) shared by client 404 and authoritative key server 408. The web server-related portion of the key establishment information may be secured with a symmetric key (e.g., $K_{AW}$) shared by authoritative key server 408 and web server 410.

At 450, client 404 initiates a secure connection with web server 410 using the key establishment information, in combination with a public-key cryptosystem, if available. Such a secure connection may be established as follows.

Client 404 determines a shared symmetric key $K_{CW}$ from its portion of the key establishment information, e.g., by using $K_{CA}$. Client 404 sends web server's 410 portion of the key establishment information to web server 410. Web server 410 determines a shared symmetric key $K_{CW}$ from its portion, e.g., by using $K_{AW}$. Client 404 and web server 410 then initiate the secure connection using a public-key cryptosystem in combination with $K_{CW}$.

Embodiments as shown and described in reference to FIG. 4 have several advantages.

Client 404 does not initially need to have shared symmetric key with any server (today, with existing secure PKI), though it can enhance connection security if it has one. Web server 410 only needs to have shared a symmetric key $K_{AW}$ with authoritative key server 408 (which it can establish again using only public-key cryptosystems). Client 404 discovers the authoritative key server via DNS. Client 404 also has a direct relationship with authoritative key server 408, which avoids operational and privacy concerns that might otherwise arise due to the use of intermediation via a recursive key server. A recursive key server is thus not required to be implemented as a separate ecosystem component, although it could be in other embodiments. The key server network is thus bootstrapped with just key set ups and DNS provisioning on the side of web server 410, thus facilitating deployment.

XV. Provisioning for Embodiments with Direct Client Interactions with an Authoritative Key Server In order for the entities shown in FIGS. 2 and 4 to interact and shown and described, they may initially be provisioned as described presently. That is, provisioning operations as described in this section facilitate the authoritative key server to interact with the recursive key server and/or client in the embodiments of FIG. 2 of both Part A and Part B as well as in the embodiments of FIG. 4.

For example, a key server administrator may configure a key production capability at an authoritative key server. Such key production capability is what allows the authoritative key server to provide key establishment information to the recursive key server and/or client based on a key production record (e.g., a SKIPO). The web server may then access this capability, obtaining key production records it can publish. The web server may in the same operation, or in a separate operation, gain access to keys it may need to process key establishment information (e.g., $K_{AW}$). The key production capability may be based on a group key, where related web servers are given access to the key. Note that clients may be given anonymous access to the key production capability associated with a given key production record, or authenticated access requiring further vetting (see Section II, below, regarding DDoS attack defenses).

Figure 5:
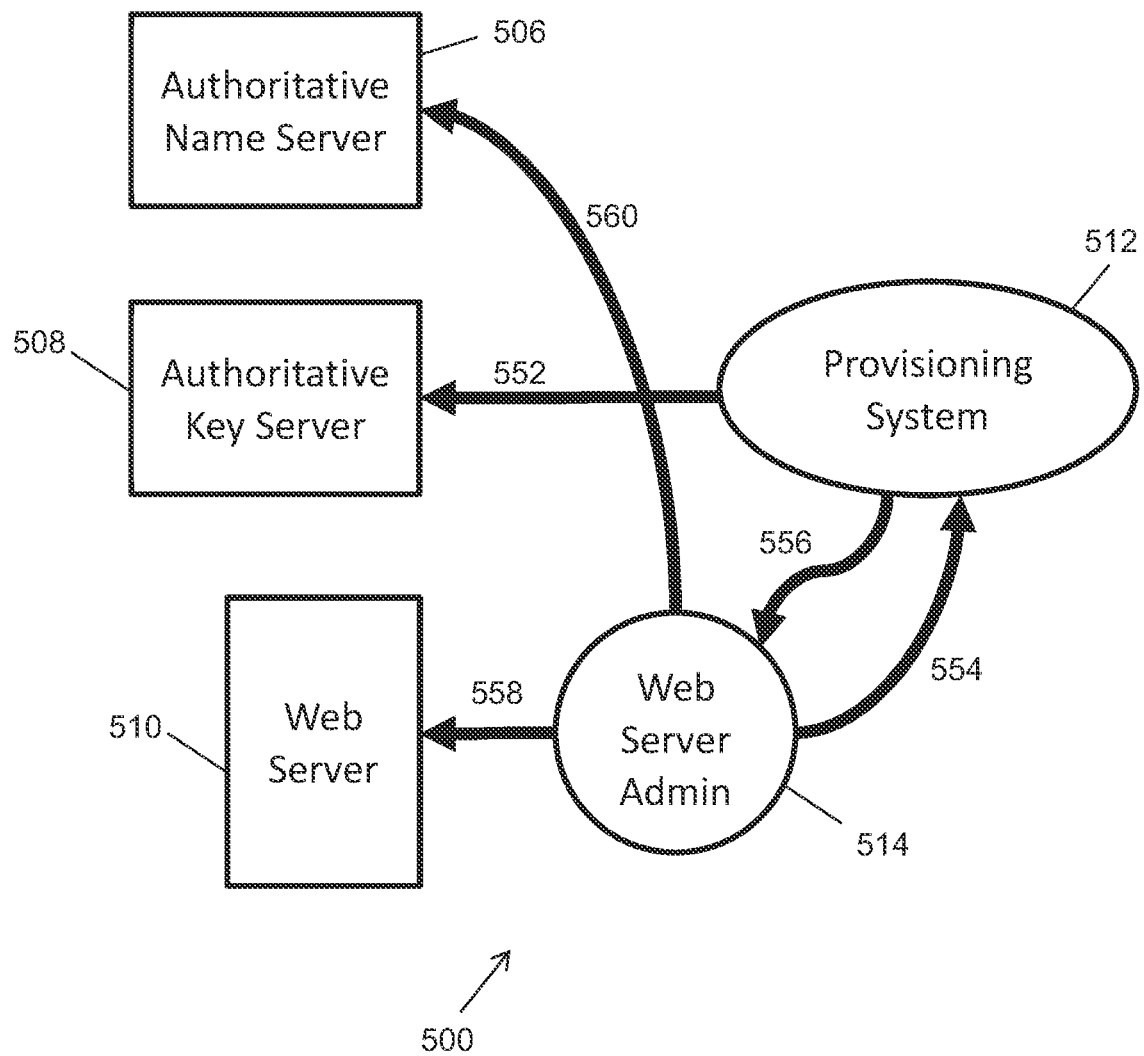
FIG. 5 is a hybrid diagram of a system for and method of provisioning a web server with symmetric-key management information according to some embodiments.

FIG. 5 is a hybrid diagram 500 of a system for and method of provisioning a web server with symmetric-key management information according to some embodiments. The authoritative name server 506, authoritative key server 508 and web server 510 shown in FIG. 5 may be the same such entities as shown in FIG. 4. In addition, FIG. 5 depicts a provisioning system 512, which may be implemented as a provisioning server, and a web server administrator 514, who may be a human administrator or a computer acting on a human's behalf.

At 552, provisioning system 512 configures a key production capability at one or more authoritative key servers 508. This step may be done in response to a web server administrator 514's request in the next step.

At 554, web server administrator 514 accesses this key production capability by sending a request to provisioning system 512.

At 556, provisioning system 512 returns a remote service endpoint, e.g., a web address by which a client may interact with the provisioned key production capability, for use in a key production record.

At 558, web server administrator 514 provisions the key production keys related to the key production capability at web server 510. This may be done by storing such keys in a key repository accessible to web server 510. This step may be done in response to the provisioning system 512's response in the previous step, or separately. In some embodiments, the web server administrator 514 may select the key production keys, then specify them in the request at 554. In other embodiments, the provisioning system may select the key production keys, then specify them in the response at 556.

At 560, web server administrator 514 publishes a key production record (e.g., a SKIPO that includes the remote service endpoint) at authoritative name server 506. Alternately, this may be replaced by publishing a DNS CNAME record to redirect to a key production record published by provisioning system 512.

At this point, web server 510 can use the key production keys to process any key establishment information received from clients such as client 404 of FIG. 4 or client 204 of FIG. 2. Actions 556, 558, and 560 may be repeated as needed to distribute additional symmetric key information, e.g., of different key types and/or validity periods.

Figure 6:
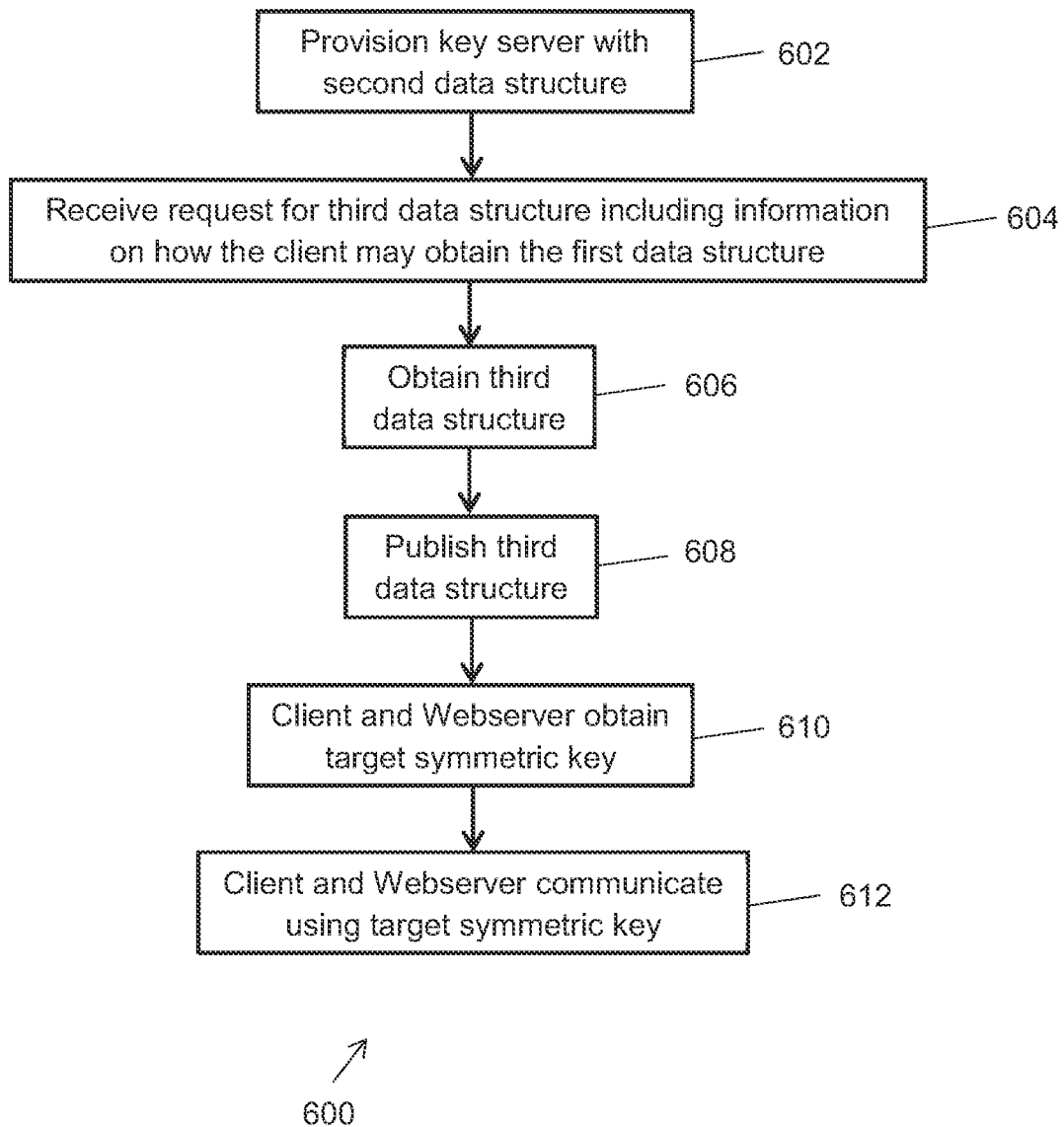
FIG. 6 is a flow chart of a method for provisioning a key server with symmetric key infrastructure, and utilizing such infrastructure, according to some embodiments.

FIG. 6 is a flow chart of a method 600 for provisioning a key server with symmetric key infrastructure, and utilizing such infrastructure, according to some embodiments. In particular, method 600 provisions a key server to facilitate secure communications between a web server and a client of the web server. The key server facilitates such communications by providing the client with a first data structure (e.g., a SKIO) that includes information on how the web server can obtain at least one target symmetric key to use in communications with the client. Method 600 may be practiced by a system such as that shown and described in reference to FIG. 5, including a provisioning system (e.g., the provisioning server of provisioning system 512), a web server (e.g., web server 510), an authoritative key server (e.g., authoritative key server 508), and an authoritative DNS name server (e.g., authoritative name server 506).

At 602, the provisioning system provisions the key server with a second data structure that includes information on how the key server may generate the first data structure. The second data structure may be, or include information sufficient to generate a SKIPO or SKITO that the key server can evaluate to produce the first data structure, for example, as set forth in detail in Sections XXVI and XXVII, below.

SKITOs are data structures that provide information about how to translate a target key and associated key parameters into a matching SKIO by which a designated correspondent, such as a web server, may obtain the same key with compatible key parameters. In general, embodiments may utilize key translation, where the target symmetric key is already available to one party, e.g., the client, and is then made available to the other party, e.g., the web server. This can be advantageous in situations where one party already has a key and wants to reuse it, and can also be a building block in a key production operation. For example, the authoritative key server may generate a fresh target symmetric key, and then translate it to make it available separately to the client and/or to the web server.

The actions of 602 are further illustrated by reference to the following non-limiting example. When the correspondent SKIPO is in local production/derived key form (see Section XXVI, below), it includes a subordinate key derivation key SKIPO. In this case, the provisioning server configures the key server at 602 so that it is able to evaluate the correspondent SKIPO. This means that the key server is configured to evaluate the subordinate KDK SKIPO. If the subordinate KDK SKIPO is in SKIO form, and the SKIO is in stored key form, then, in effect, the subordinate KDK SKIPO conveys a static key identifier for some separately defined KDK. At 602, the provisioning server provisions the key server with the correspondent SKIPO, i.e., so that it has information sufficient to evaluate the correspondent SKIPO to produce a SKIO when requested, such as in interactions as shown and described in reference to FIGS. 2 and 4. This provisioning process may also include provisioning the key server with the subordinate KDK itself. (The web server administrator may similarly set up the web server so that the web server has this KDK.) A similar situation holds when the correspondent SKIPO has a subordinate key wrapping key (KWK) The subordinate KDK or KWK, and more generally, the correspondent SKIPO, may be specified by the provisioning server, by the web server administrator, or by a combination of information provided by both entities. The subordinate KDK or KWK may be established as part of the provisioning operation, or within a separate operation.

At 604, the provisioning server receives a request on behalf of a web server for a third data structure comprising information on how the client may obtain the first data structure from the key server. The third data structure may include an address for the key server according to some embodiments.

At 606, the provisioning server, in response to the request of 604, obtains a third data structure that includes information on how the client may obtain the first data structure from the key server. The third data structure may be a data structure that includes a remote service endpoint or a web address of the key server, according to various embodiments. The provisioning server may obtain the third data structure by generating it or by obtaining it from the key server, according to various embodiments.

At 608, once the provisioning server obtains the third data structure, the third data structure may be published in association with an identification of the web server, in a publicly available online location. The third data structure may be published by the provisioning server itself, by the web server administrator, or by another separate publishing server. In addition, the second data structure or information sufficient to generate the second data structure may also be published with the third data structure. This may conclude the provisioning portion of the method of FIG. 6 according to some embodiments.

A client may proceed to use the provisioned symmetric key infrastructure to secure communications with the web server as follows.

At 610, once the provisioning is completed, a client initiates secure communications with the web server. To do this, the client obtains the third data structure from its published location by specifying the web server with which it wishes to communicate, or a group that includes the web server (see Section XVI, below). Next, the client uses the information in the third data structure to obtain a [the] first data structure from the key server. According to an embodiment, the client may also obtain the second data structure from a published location and provide the second data structure to the key server in addition to the third data structure. The client then provides the first data structure, or equivalent information, to the web server with which it wishes to communicate. The web server evaluates the first data structure, e.g., a SKIO, to obtain a copy of the target symmetric key and associated parameters, e.g., from the key server.

According to some embodiments, the key server may also return a fourth data structure that includes information on how the requester can obtain the target symmetric key. In such embodiments, the client may also provide a fifth data structure to the key server, wherein the fifth data structure includes information that the key server can evaluate to produce the fourth data structure. The fifth data structure may be, or include, information sufficient to generate a SKIPO or SKITO. According to an embodiment, the fifth data structure, like the second data structure, may have been previously provisioned at the key server and published in association with the web server, in which case the client may also provide the fifth data structure to the key server along with the third data structure.

According to some such embodiments, the second data structure may be a SKIPO and the fifth data structure may be a SKITO; and the key server may generate the first data structure according to the second data structure then translate it (or its associated target key) into the fourth data structure according to the fifth data structure. According to other such embodiments, the second data structure may be a SKITO and the fifth data structure may be a SKIPO; and the key server may generate the fourth data structure according to the fifth data structure then translate it (or its associated target key) into the first data structure according to the second data structure. In both such embodiments, the key server may then return both the first data structure and the fourth data structure to the client. If both data structures are SKIOs, this is effectively a "SKIO pair production" operation. The client may use the fourth data structure to obtain a copy of the target symmetric key.

According to other embodiments, instead of receiving the fourth data structure from the key server, the client may generate the fourth data structure itself and provide it to the key server. In such embodiments, the fourth data structure includes information on how the key server can obtain the target symmetric key. According to such embodiments, the second data structure may be a SKITO; and the key server may translate the fourth data structure (or its associated target key) into the first data structure according to the second data structure. The key server may then return the first data structures. If the fourth data structure and the first data structure are both SKIOs, this is effectively a "SKIO translation" operation.

At 612, the client uses the target symmetric key to securely communicate with the web server. Such secure communications may include encrypting one or more messages between the client and the web server.

XVI. Group Keys and Client Privacy

Key establishment information (e.g., SKITOs) may involve a group key shared by multiple web servers in an appropriate trust relationship, e.g., operated by same hosting provider. Such group keys can be unique per client, or shared by multiple clients in the same client group. Group keys can improve client privacy, because the client's request to an authoritative key server, and the key establishment information sent to the hosting provider, would only identify the web server group, rather than the individual web server.

Group keys can also improve client efficiency, because the key establishment information obtained for one web server in the group can be cached and reused for other web servers. Such reuse potential for a group key can be indicated by having the same key production record associated with the key.

XVII. Record Matching Criteria and Adaptive Responses

Similar to requests for other information published in the DNS, a request for key production records may include matching criteria to filter and reduce the size of the response. For example, such requests may be filtered on the types of symmetric keys produced, the production approaches, the authoritative key servers, etc. Such criteria may be conveyed via DNS Extension Mechanisms (EDNS).

An authoritative name server may also adapt responses based on location, identity, and/or other attributes of the client. This may be done in a manner similar to DNS-based load balancing. It may also be done with techniques for adaptive or authenticated resolution described in U.S. Pat. No. 8,990,356 entitled "Adaptive Name Resolution", which is incorporated by reference herein in its entirety. For example, a response may be customized with key identifier and/or algorithms associated with a specific client. Further, DNSSEC signing of various potential customized response sets may be used.

XVIII. Local Authoritative Key Servers

Some embodiments may utilize authoritative key servers that are, in a sense, local to a requesting client. According to some embodiments, a DNS authoritative name server may respond to a DNS resolution request for a key production record associated with a web server by returning a record pointing to (e.g., whose remote service endpoint is) a local authoritative key server that the client is likely to already to share a symmetric key with. Alternatively or in addition, when a client makes a request for an IP address of an authoritative key server, the response may be adapted to include the IP address of a local key server.

According to such embodiments, a client's own DNS recursive name server may be configured to serve as a local authoritative key server, transparently to the client. This leverages the emerging deployment of DNS encryption between clients and recursive name servers, and offers similar benefits to a recursive key server (in terms of bringing keying material closer to the client) without requiring a separate ecosystem component. Note that locality in this sense is easy to detect if the client makes its request to the authoritative name server via such a recursive name server. According to some embodiments, a provisioning system (e.g., provisioning system 512 of FIG. 5) can so configure recursive name servers on a web server's behalf.

The provisioning system can either provide appropriate key production records for a web server administrator (e.g., web server administrator 514 of FIG. 5) to publish, or can publish them itself and give the web server administrator a pointer to publish (e.g., a DNS CNAME).

Alternately, or in addition, an authoritative key server (e.g., authoritative key server 508 of FIG. 5) can also arrange for the recursive name server to serve as one of its own authoritative key servers.

XIX. Key Production Record Publication Outside DNS

Part A notes that a client may discover a web server's key server record in DNS by looking for DNS records for related domains, e.g., a parent or child of the web server's domain name. Expanding on this point, a key server record (or more generally, a key production record) may be published via such a non-DNS service, e.g., an external directory, to reduce the frequency of changes to DNS records and benefit from the non-DNS service's data management capabilities. This arrangement may be useful for the secure email use case described in Section XXII below due to potentially large number of user records involved, as well as due to privacy considerations.

XX. Key Splitting

Part A, Section V, describes a privacy enhancement where the client combines keys from multiple key servers, e.g., by key derivation, in such a way that none of the key servers can determine the resulting key on its own. Key derivation with multiple keys done this way offers an N-of-N threshold property: knowledge of all N input keys is required to determine the output key. A more general way to obtain such a threshold property is with secret sharing or key splitting: the target symmetric key can be split into N shares such that knowledge of at least $K<N$ shares is required to reconstruct the target key, i.e., a K-of-N scheme. A client can use key splitting to produce key establishment information by splitting a target symmetric key into N shares, then translating each share via a separate key server.

XXI. Shared Symmetric Keys as an Additional DDoS Defense Mechanism

In addition to providing a second factor against cryptosystem compromises, shared symmetric keys according to embodiments disclosed herein can offer an additional defense against Distributed Denial of Service (DDoS) attacks. For example, in the Transport Layer Security (TLS) protocol, when a client wants to establish a secure session, the server may require the client to use a previously established shared symmetric key (e.g., an External Pre-Shared Key). According to the TLS specification, such a client must provide a partial proof of knowledge of the key to server early in the handshake (via "binder value").

Here, a server can prioritize and/or adapt its response based on the presence and properties of the key (and proof), helping to distinguish legitimate users (who have previously obtained a shared symmetric key) from attackers (who presumably have not). More particularly, an authoritative key server can vet a client as part of processing its request for key establishment information and convey the vetting status, possibly including priority, in the returned key establishment information (or reject the request entirely). This offloads some or all of the client vetting from real-time interactions with the server, and also makes it possible to do the vetting and request processing well ahead of an actual request. In addition, because key establishment information (and the associated vetting) can be requested from an authoritative key server in advance of the actual request, this further reduces the impact of DDoS attacks on the authoritative key servers, because legitimate clients will have been vetted in advance and do not generally need to interact with a key server in real time.

According to some embodiments, a server may refer a requesting client to a second server for further processing. Such embodiments may also utilize group keys: if the second server belongs to the same group, i.e., knows the same group key, then the client can reuse the key.

XXII. Further Examples of Securing Communications

Embodiments according to this disclosure are not limited to obtaining a shared symmetric key to encrypt communications between a client and a web server (e.g., via HTTP over Transport Layer Security or "TLS"). Rather, shared symmetric keys as disclosed herein can be employed for securing other communications. Examples in which a shared symmetric key may be used to secure communications include other protocols that run over TLS, including DNS-over-TLS, other secure transports (e.g., Datagram TLS), network security (e.g., virtual private networks secured with IPsec), email security (e.g., based on Cryptographic Message Syntax) where symmetric keys are associated with users or groups of users, and secure communications for other applications such as Internet of Things (IOT), blockchain, and cryptocurrency applications.

XXIII. Symmetric Key Information Elements

This, and subsequent sections, present example data structures that may be utilized in embodiments disclosed herein. These sections describe in detail how symmetric key infrastructure concepts such key establishment information, key production records, and key server protocols, may be realized. Note that although these data structures are presented in detail, embodiments may utilize different data structures, different classes of data structures, and/or different characterizations of data structures. Although the examples utilize pseudocode syntax that is based on JavaScript Object Notation (JSON), other forms may be used in the alternative. Further, these sections describe other conceptualizations, such as key classes, key parameters, and several "Symmetric Key Information" elements, including object syntax and protocol requests and responses. Table 1, below, summarizes various symmetric key information elements, which are further described in detail in subsequent sections.

TABLE 1

Symmetric Key Information Elements

| Element | Description |
| --- | --- |
| SKIO: Symmetric Key Information Object | Data structure with information about how to obtain a target key from other keys or out of band |
| SKIPO: Symmetric Key Information Production Object | Data structure with information about how to produce a target key and a matching SKIO by which a correspondent may obtain same key |
| SKITO: Symmetric Key Information Translation Object | Data structure with information about how to translate a SKIO into a matching SKIO by which a correspondent may obtain same key |
| SKIRP: Symmetric Key Information Resolution Protocol | Protocols for interacting with a key server to resolve a SKIPO or SKITO into one or more SKIOs |
| SKIPP: Symmetric Key Information Provisioning Protocol | Protocols for interacting with a key server to provision its resolution services and obtain SKIPOs, SKITOs and keys for local resolution |
| SKIPR: Symmetric Key Information Production Rule | Customized profile guiding production, validation and processing of SKIO and associated keys |

XXIIII. Key Classes

Symmetric keys managed according to various embodiments may belong to key classes that specify underlying cryptographic functions. For example, the shared target symmetric keys produced according to the disclosed embodiments may be classified according to the following.

According to various embodiments, there are also four families of key classes: key derivation, key wrapping, key splitting, application. Further, key classes may also specifies key length, e.g., in terms of number of bytes of keys in the class; different key lengths may belong to different classes.

The key class of the target key that is produced by processing a SKIO, SKIPO or SKITO may be in any of the families. Key classes of subordinate SKIOs may be in a key derivation, key wrapping, or key splitting family.

Other families can also be accommodated in this framework, e.g., key "wrapdering", where the target key depends on derivation parameters (as in key derivation), and additional secrets are associated with target key and conveyed confidentially (as in key wrapping).

Key classes may also specify constraints on the use of keys, including, for key classes of subordinate SKIOs, which SKIPRs they support for production of target keys.

Table 2 below summarizes various key class families, which are explained in detail further below.

TABLE 2

Key Class Families

| Family | Usage | Key Type | Underlying Cryptographic Functions |
|---|---|---|---|
| Key derivation | Production, processing of SKIOs in derived key form | Key Derivation Key (KDK) | Key derivation function |
| Key wrapping | Production, processing of SKIOs in wrapped key form | Key Wrapping Key (KWK) | Key wrapping/ unwrapping functions |
| Key splitting | Production, processing of SKIOs in split key form | Key Share (KS) | Key splitting/ reconstruction functions |
| Application | Other operations | Application key | Application-defined |

The key derivation family includes key classes that support production and processing of SKIOs in derived key form. Keys in these classes are called key derivation keys (KDKs). Key classes in this family specify a key derivation function that maps one or more KDK(s) and a derivation parameter string to a target key. Target keys established via these classes depend on, and are securely associated with, derivation parameters (as represented by the derivation parameter string).

The key wrapping family includes key classes that support production and processing of SKIOs in wrapped key form. Keys in these classes are called key wrapping keys (KWKs). Key classes in this family specify a key wrapping function that maps a KWK, a wrapped parameter string, and an encoded key string to a wrapped key, as well as a corresponding key unwrapping function. The encoded key string represents a target key and optionally additional secrets. Target keys established via these classes are independent of, but securely associated with, the wrapping parameter string, and additional secrets are also securely associated and conveyed confidentially with the target key.

The key splitting family includes key classes that support production and processing of SKIOs in split key form. Keys in these classes are called key shares (KSs). Key classes in this family specify a key splitting function that maps a target key to two or more key shares, as well as a corresponding key reconstruction function that maps a threshold number of key shares to a target key.

The key application family includes key classes that support operations other than production and processing of SKIOs, such as setting up secure connections with a web server (and other use cases). In some embodiments according to FIGS. 2 and 4, the symmetric key established for securing the connection between the client and web server may be in a key class in an application family, e.g., a TLS external pre-shared key.

Parameters may be associated with keys in any class. More generally, embodiments benefit from flexibility through extensive parameterization within various objects, as well as for keys. Parameters provide additional information on the production and processing of keys, and their subsequent use. Parameters may include key server name, web server name, client identifier, counter, nonce, validity period, and so on. Parameter types, syntax, and interpretation may be registered" in a protocol parameter registry. A SKIPR (see Section XXX below) provides details on which parameters are required or optional for a respective SKIO, SKIPO, or SKITO governed by the SKIPR. A SKIPR also provides mappings between different parameter sets at various stages of processing.

XXV. SKIOs

A Symmetric Key Information Object (SKIO) is data structure that provides information about how to obtain a symmetric target key and associated key parameters, given knowledge of other relevant symmetric keys and/or access to out-of-band resources. When processing, the input is a SKIO, and the output is a target key and associated key parameters.

According to some embodiments of FIGS. 2 and 4, key establishment information can be realized with two SKIOs: one that the client processes to obtain the target key and key parameters, and one that the client can send to the web server for the web server to process to obtain same target key with compatible key parameters.

There are five SKIO forms, based on how target key is produced, as depicted in Table 3, below. A SKIO is a recursive data structure: in three SKIO forms, underlying information is conveyed as a subordinate (Ks. A production rule or SKIPR guides details of the processing. After a SKIO is evaluated, the results can be cached and reused for repeated occurrences of the same SKIO.

TABLE 3

SKIO Forms

| SKIO Form | Description | Subordinate Objects |
|---|---|---|
| Exported key | Target key exported from key exporter | None |
| Stored key | Target key looked up in key store | None |
| Derived key | Target key derived from one or more key derivation key(s) | KDK SKIO(s) |
| Wrapped key | Target key (un)wrapped with key wrapping key | KWK SKIO |
| Split key | Target key reconstructed from two or more key shares | Key share SKIOs |

A detailed description of each of the five SKIO forms follows.

The exported key SKIO form indicates that the target key is exported from a key exporter.

Exported Key SKIO Form Example Syntax:

```
{       "skioForm": "exportedKey",    — SKIO form
        "keyClass": <class id>,        — target key class
        "skipr": <rule id>,            — production rule
        "skioParams": <params>,        — SKIO parameters
        "exporterClass": <class id> ,  — key exporter class
        "exporterID": <string>         — key exporter identifier
}
```

Exported Key SKIO Form Example Processing Steps:
(input=SKIO; mappings per production rule)
(1) Map target key class, SKIO parameters to derivation parameter string.
(2) Apply key exporter class-defined key export interface to key exporter identifier and derivation parameter string to obtain target key of specified key class.
(3) Map encoded key string to target key of specified key class.

(4) Map SKIO parameters to key parameters.
(5) Return target key and key parameters.

The stored key SKIO form indicates that the target key is looked up in a key store.

Stored Key SKIO Form Example Syntax:

| { | "skioForm": "storedKey", | — SKIO form |
| | "keyClass": \<class id\>, | — target key class |
| | "skipr": \<rule id\>, | — production rule |
| | "skioParams": \<params\>, | — SKIO parameters |
| | "storeClass": \<class id\> , | — key store class |
| | "storeID": \<string\>, | — key store identifier |
| | "keyID": \<string\> | — key identifier |
| } | | |

Stored Key SKIO Form Example Processing Steps:
(input=SKIO; mappings per production rule)
(1) Map target key class and SKIO parameters to wrapping parameter string.
(2) Apply key store class-defined key lookup interface to key store identifier, key identifier, and wrapping parameter string to obtain encoded key string.
(3) Map encoded key string to target key of specified key class and additional secrets.
(4) Map SKIO parameters and additional secrets to key parameters.
(5) Return target key and key parameters.

The derived key SKIO form indicates that the target key is derived from one or more key derivation keys.

Derived Key SKIO Form Example Syntax:

| { | "skioForm": "derivedKey", | — SKIO form |
| | "keyClass": \<class id\>, | — target key class |
| | "skipr": \<rule id\>, | — production rule |
| | "skioParams": \<params\>, | — SKIO parameters |
| | "kdkSKIO": \<skio(s)\> | — KDK SKIO(s) |
| } | | |

Derived Key SKIO Form Example Processing Steps:
(input=SKIO; mappings per production rule)
(1) Process KDK SKIO(s) recursively to obtain KDK(s).
(2) Map target key class, SKIO parameters to derivation parameter string.
(3) Apply KDK class-defined key derivation function to KDK(s) and derivation parameter string to obtain target key of specified class.
(4) Map SKIO parameters to key parameters.
(5) Return target key, key parameters.

The wrapped key SKIO form indicates that the target key is unwrapped with a key wrapping key.

Derived Key SKIO Form Example Syntax:

| { | "skioForm": "wrappedKey", | — SKIO form |
| | "keyClass": \<class id\>, | — target key class |
| | "skipr": \<rule id\>, | — production rule |
| | "skioParams": \<params\>, | — SKIO parameters |
| | "kwkSKIO": \<skio\>, | — KWK SKIO |
| } | "wrappedKey": \<string\> | — wrapped key |

Wrapped Key SKIO Form Example Processing Steps:
(input=SKIO; mappings per production rule)
(1) Process KWK SKIO recursively to obtain KWK.
(2) Map target key class, SKIO parameters to wrapping parameter string.
(3) Apply KWK class-defined key (un)wrapping function to KWK, wrapping parameter string, and wrapped key to obtain encoded key string.
(4) Map encoded key string to target key of specified key class and additional secrets.
(5) Map SKIO parameters, additional secrets to key parameters.
(6) Return target key and key parameters.

The split key SKIO form indicates that the target key is reconstructed from two or more key shares.

Split Key SKIO Form Example Syntax:

| { | "skioForm": "splitkey", | — SKIO form |
| | "keyClass": \<class id\>, | — target key class |
| | "skipr": \<rule id\>, | — production rule |
| | "skioParams": \<params\>, | — SKIO parameters |
| | "shareSKIO": \<skios\> | — key share SKIOs |
| } | | |

Split Key SKIO Form Example Processing Steps:
(input=SKIO; mappings per production rule)
(1) Process threshold number of key share SKIOs recursively to obtain key shares and per-share key parameters. The threshold is determined by a production rule.
(2) Apply key share class-defined key reconstruction function to key shares to obtain a target key of specified class.
(3) Map SKIO parameters and per-share key parameters to key parameters.
(4) Return target key and key parameters.

XXVI. SKIPOs

A Symmetric Key Information Production Object (SKIPO) is a data structure that provides information about how to produce (1) a target key and associated key parameters (e.g., for a client), and (2) a matching SKIO by which a designated correspondent (e.g., a web server) may obtain same key with compatible key parameters. When processing, the input is a SKIPO and parameters specified by an application, and the output is a correspondent SKIO, a target key, and key parameters.

According to some embodiments of FIGS. 2 and 4, key production information can be realized with a SKIPO that the recursive key server or client can process to produce target key, key parameters, and a matching SKIO for the web server.

There are ten SKIPO forms, depending on whether the keys are already established (two forms, Table 4), produced locally, possibly using underlying separately produced keys (five forms, Table 5), or produced with assistance from a remote key server (three forms, Table 6). A SKIPO is a recursive data structure: in several forms, underlying information is conveyed as subordinate SKIPO(s) (or SKITO(s), see Section XXVII, below). A production rule governs details of the processing. After a SKIPO is evaluated, the results can be cached and reused for repeated occurrences of same SKIPO with same production parameters, per the production rule's expiration policy.

A description of the SKIPO forms for already established keys immediately follows.

TABLE 4

SKIPO Forms for Already Established Keys

| SKIPO Form | Target Key Processing | Correspondent SKIO Content | Subordinate Objects |
|---|---|---|---|
| SKIO | Target key obtained by processing Common SKIO | Common SKIO | Common SKIO |

TABLE 4-continued

SKIPO Forms for Already Established Keys

| SKIPO Form | Target Key Processing | Correspondent SKIO Content | Subordinate Objects |
|---|---|---|---|
| SKIO Pair | Target key obtained by processing Requester SKIO | Correspondent SKIO | Requester SKIO, Correspondent SKIO |

A detailed description of both SKIPO forms for existing keys follows.

The SKIO-form SKIPO indicates that the target key is obtained by processing a common SKIO. The correspondent SKIO is the same as the requester SKIO.

SKIO-Form SKIPO Example Syntax:

```
{    "skipoForm": "skio",      — SKIPO form
     "corSKIO": <skio>         — common SKIO
}
```

SKIO-Form SKIPO Example Processing Steps:
(input=SKIPO+production parameters; mappings per production rule)
(1) Validate that production parameters are consistent with common SKIO.
(2) Process common SKIO to obtain target key and key parameters.
(3) Return common SKIO, target key class, target key, and key parameters.

Note that the target key class and the production rule for this SKIPO are based on the common SKIO. There may be no SKIPO parameters in this form.

The SKIO-Pair SKIPO form indicates that the target key is obtained by processing a requester SKIO. The correspondent SKIO is the second half of the pair.

SKIO-Pair SKIPO Form Example Syntax:

```
{    "skipoForm": "skioPair",  — SKIPO form
     "reqSKIO": <skio>,        — Requester SKIO
     "corSKIO": <skio>         — Correspondent SKIO
}
```

SKIPO-Pair SKIPO Form Example Processing Steps:
(input=SKIPO+production parameters; validation per production rule)
(1) Validate that production parameters are consistent with Requester and Correspondent SKIOs.
(2) Process Requester SKIO to obtain target key and key parameters.
(3) Return Correspondent SKIO, target key class, target key, and key parameters.

The target key class and production rule for this SKIPO are based on the correspondent SKIO. There may be no SKIPO parameters in this form. The requester and correspondent production rules may be different (as is the case for requester and correspondent SKIOs in general).

A description of the five local SKIPO forms follows.

TABLE 5

Local Production SKIPO Forms

| SKIPO Form | Target Key Preparation | Correspondent SKIO Content | Subordinate Objects |
|---|---|---|---|
| Local/Exported Key | Target key exported from key exporter | Key exporter ID | None |

TABLE 5-continued

Local Production SKIPO Forms

| SKIPO Form | Target Key Preparation | Correspondent SKIO Content | Subordinate Objects |
|---|---|---|---|
| Local/Stored Key | Target key generated, stored in key store | Key store ID Key ID | None |
| Local/Derived Key | Target key derived from KDK(s) | KDK SKIO(s) | Requester-correspondent KDK SKIPO(s) |
| Local/Wrapped Key | Target key generated, wrapped with KWK | Wrapped key KWK SKIO | Requester-correspondent KWK SKIPO |
| Local/Split Key | Target key generated, split into key shares | Key share SKIOs | Key share SKITOs |

A detailed description of the local production SKIPO forms follows.

The local/exported key SKIPO form indicates that the target key is exported from a key exporter. The correspondent SKIO is prepared from a key exporter identifier.

Local/Exported Key SKIPO Form Example Syntax:

```
{    "skipoForm": "localProdExportedKey",  — SKIPO form
     "keyClass": <class id>,                — target key class
     "skipr": <rule id>,                    — production rule
     "skipoParams": <params>,               — SKIPO parameters
     "exporterclass": <class ID>,           — key exporter class
     "exporterID": <store ID>               — key exporter identifier
}
```

Local/Exported Key SKIPO Form Example Processing Steps:
(input=SKIPO+production parameters; mappings per production rule)
(1) Map target key class, SKIPO parameters, and production parameters to SKIO parameters.
(2) Map target key class and SKIO parameters to derivation parameter string.
(3) Apply key store class-defined key export interface to key exporter identifier and derivation parameter string to obtain target key of specified class.
(4) Prepare Correspondent SKIO from SKIO parameters and key exporter identifier.
(5) Map SKIO parameters to key parameters.
(6) Return Correspondent SKIO, target key, and key parameters.

The local/stored key SKIPO form indicates that the target key is generated and stored in key store. The correspondent SKIO is prepared from a key store identifier and a key identifier.

Example Local/Stored Key SKIPO Syntax:

```
{    "skipoForm": "localProdStoredKey",  — SKIPO form
     "keyClass": <class id>,              — target key class
     "skipr": <rule id>,                  — production rule
     "skipoParams": <params>,             — SKIPO parameters
     "storeClass": <class ID>,            — key store class
     "storeID": <store ID>                — key store identifier
}
```

Local/Stored Key SKIPO Example Processing Steps:
(input=SKIPO+production parameters; mappings per production rule)

(1) Map target key class, SKIPO parameters, and production parameters to SKIO parameters and additional secrets.
(2) Map target key class and SKIO parameters to wrapping parameter string.
(3) Generate or otherwise obtain fresh target key of specified class.
(4) Map target key and additional secrets to encoded key string.
(5) Apply key store class-defined key storage interface to key store identifier, encoded key string, and wrapping parameter string to obtain key identifier.
(6) Prepare Correspondent SKIO from SKIO parameters, key store identifier, and key identifier.
(7) Map SKIO parameters and additional secrets to key parameters.
(8) Return Correspondent SKIO, target key, and key parameters.

The local/derived key SKIPO form indicates that the target key is derived from KDK(s). The correspondent SKIO is prepared from KDK SKIO(s).

Local/Derived Key SKIPO Example Syntax:

```
{    "skipoForm": "localProdDerived",    — SKIPO form
     "keyClass": <class id>,              — target key class
     "skipr": <rule id>,                  — production rule
     "skipoParams": <params>,             — SKIPO params
     "kdkSKIPO": <skipo(s)>               — KDK SKIPO(s)
}
```

Local/Derived Key SKIPO Example Processing Steps:
(input=SKIPO+production parameters; mappings per production rule)
(1) Map target key class, SKIPO parameters, and production parameters to SKIO parameters and per-KDK production parameters.
(2) Process each KDK SKIPO recursively with respective per-KDK production parameters as input to produce KDK SKIO(s) and matching KDK(s).
(3) Map target key class and SKIO parameters to derivation parameter string.
(4) Apply KDK class-defined key derivation function to KDK(s) and derivation parameter string to obtain target key of specified class.
(5) Prepare Correspondent SKIO from SKIO parameters and KDK SKIO(s).
(6) Map SKIO parameters to key parameters.
(7) Return Correspondent SKIO, target key, and key parameters.

The local/wrapped key SKIPO form indicates that the target key is generated and then wrapped with KWK. The correspondent SKIO is prepared from the wrapped key and KWK SKIO.

Local/Derived Key SKIPO Example Syntax:

```
{    "skipoForm": "localProdWrapped",    — SKIPO form
     "keyClass": <class id>,              — target key class
     "skipr": <rule id>,                  — production rule
     "skipoParams": <params>,             — SKIPO parameters
     "kwkSKIPO": <skipo>                  — KWK SKIPO
}
```

Local/Derived Key SKIPO Example Processing Steps:
(input=SKIPO+production parameters; mappings per production rule)

(1) Map target key class, SKIPO parameters, and production parameters to SKIO parameters, additional secrets, and KWK production parameters.
(2) Process KWK SKIPO recursively with KWK production parameters as input to produce KWK SKIO and matching KWK.
(3) Map target key class and SKIO parameters to wrapping parameter string.
(4) Generate or otherwise obtain fresh target key of specified class.
(5) Map target key and additional secrets to encoded key string.
(6) Apply KWK class-defined key wrapping function to KWK, wrapping parameter string, and encoded key string to obtain wrapped key.
(7) Prepare Correspondent SKIO from SKIO parameters, KWK SKIO, and wrapped key.
(8) Map SKIO parameters and additional secrets to key parameters.
(9) Return Correspondent SKIO, target key, and key parameters.

The local/split key SKIPO form indicates that the target key is generated and then split into key shares. The correspondent SKIO is prepared from key share SKIOs.

Local/Split Key SKIPO Example Syntax:

```
{    "skipoForm": "localProdSplit",      — SKIPO form
     "keyClass": <class id>,              — target key class
     "skipr": <rule id>,                  — production rule
     "skipoParams": <params>,             — SKIPO parameters
     "shareSKITO": <skitos>               — key share SKITOs
}
```

Local/Split Key SKIPO Example Processing Steps:
(input=SKIPO+production parameters; mappings per production rule)
(1) Map target key class, SKIPO parameters, and production parameters to SKIO parameters, per-share key parameters, and per-share translation parameters.
(2) Generate or otherwise obtain fresh target key of specified class.
(3) Apply key share class-defined key splitting function to target key to obtain total number of key shares. The total number and threshold for reconstruction is based on the production rule.
(4) Process each key share SKITO recursively with respective key share, per-share key parameters, and per-share translation parameters as input to produce key share SKIOs.
(5) Prepare the correspondent SKIO from SKIO parameters and key share SKIOs.
(6) Map SKIO parameters and per-share key parameters to key parameters.
(7) Return Correspondent SKIO, target key class, target key, and key parameters.

A description of the SKIPO forms for keys that are produced with the assistance from a remote server (e.g., a remote authoritative key server) follows. Note that in Remote I and Remote II forms, the Requester SKIO is produced remotely, e.g., by an authoritative key server. In the Hybrid form, the Requester SKIO is produced locally (by the requester).

TABLE 6

Remote Production SKIPO Forms

| SKIPO Form | Description | Subordinate Objects |
|---|---|---|
| Remote I | Requester SKIO produced and translated into Correspondent SKIO remotely. Requester SKIO processed locally to obtain target key. | Requester-server target key SKIPO. Server-correspondent target key SKITO. |
| Remote II | Correspondent SKIO produced and translated into Requester SKIO remotely. Requester SKIO processed locally to obtain target key. | Requester-server target key SKITO. Server-correspondent target key SKIPO. |
| Hybrid | Requester SKIO and target key produced locally. Requester SKIO translated into Correspondent SKIO remotely. | Requester-server target key SKIPO. Server-correspondent target key SKITO. |

The Remote I SKIPO form indicates that the requester SKIO is produced and translated into a Correspondent SKIO remotely, e.g., at an authoritative key server. The Requester SKIO is processed locally to obtain the target key.

Remote I SKIPO Example Syntax:

```
{   "skipoForm": "remoteProdI",   — SKIPO form
    "skipoParams": <params>,      — SKIPO parameters
    "skirpSrv": <uri>,            — remote service endpoint
    "reqSKIPO": <skipo>,          — Requester SKIPO
    "corSKITO": <skito>,          — Correspondent SKITO
    "skirpInfo": <string>         — additional information (optional)
}
```

Remote I SKIPO Example Processing Steps:
(input=SKIPO+production parameters; mappings per production rule)
(1) Map target key class, SKIPO parameters, and production parameters to requester production parameters and correspondent translation parameters.
(2) Prepare SKIRP pair production request type I from Requester SKIPO, requester production parameters, Correspondent SKITO, and correspondent translation parameters.
(3) Send request to service endpoint for remote processing.
(4) Receive SKIRP pair production response including Requester SKIO and Correspondent SKIO.
(5) Process Requester SKIO to obtain target key and key parameters.
(6) Return Correspondent SKIO, target key, and key parameters. Target key class and production rule for this SKIPO are based on Correspondent SKITO.

The Remote II SKIPO form indicates that the Correspondent SKIO is produced and translated into the Requester SKIO remotely. The Requester SKIO is processed locally to obtain the target key.

Remote II SKIPO Form Example Syntax:

```
{   "skipoForm": "remoteProdII",  — SKIPO form
    "skipoParams": <params>,      — SKIPO parameters
    "skirpSrv": <uri>,            — remote service endpoint
    "reqSKITO": <skito>,          — Requester SKITO
    "corSKIPO": <skipo>,          — Correspondent SKIPO
    "skirpInfo": <string>         — additional information (optional)
}
```

Remote II SKIPO Example Processing Steps:
(input=SKIPO+production parameters; mappings per production rule)
(1) Map target key class, SKIPO parameters, and production parameters to requester translation parameters and correspondent production parameters.
(2) Prepare SKIRP pair production request type II from Requester SKITO, requester translation parameters, Correspondent SKIPO, and correspondent production parameters.
(3) Send request to service endpoint for remote processing.
(4) Receive SKIRP pair production response including Requester SKIO and Correspondent SKIO.
(5) Process Requester SKIO to obtain target key, key parameters.
(6) Return Correspondent SKIO, target key, and key parameters.

The target key class and production rule for Remote II SKIPOs are based on the Correspondent SKIPO.

The Hybrid form SKIPO indicates that the Requester SKIO and target key are produced locally. The Requester SKIO is then translated into the Correspondent SKIO remotely.

Hybrid SKIPO Example Syntax:

```
{   "skipoForm": "hybridProd",    — SKIPO form
    "skipoParams": <params>,      — SKIPO parameters
    "skirpSrv": <uri>,            — remote service endpoint
    "reqSKIPO": <skipo>,          — Requester SKIPO
    "corSKITO": <skito>,          — Correspondent SKITO
    "skirpInfo": <string>         — additional information (optional)
}
```

Hybrid SKIPO Example Processing Steps:
(input=SKIPO+production parameters; mappings per production rule)
(1) Map target key class, SKIPO parameters, and production parameters to requester production parameters and correspondent translation parameters.
(2) Process Requester SKIPO locally with requester production parameters as input to produce Requester SKIO, target key, and key parameters.
(3) Prepare SKIRP translation request from Requester SKIO, Correspondent SKITO, and correspondent translation parameters.
(4) Send request to service endpoint for remote processing.

(5) Receive SKIRP translation response including Correspondent SKIO.
(6) Return Correspondent SKIO, target key, and key parameters.

The target key class and production rule for the Hybrid SKIPO are based on the Correspondent SKITO.

XXVII. SKITOs

A Symmetric Key Information Translation Object (SKITO) is a data structure that provides information about how to translate a target key and associated key parameters into a matching SKIO by which a designated correspondent may obtain the same key with compatible key parameters. When processing, the input is a SKITO, a target key, key parameters, and translation parameters specified by an application, and the output is a Correspondent SKIO. A production rule governs the details of processing. After a SKITO is evaluated, the results can be cached and reused for repeated occurrences of the same SKITO/SKIO and translation parameters, per the production rule's expiration policy.

Although employed indirectly in some embodiments of FIGS. 2 and 4, SKITOs may also be used directly, e.g., in use cases where target key is previously established.

SKITOs have four forms, depending on whether the keys are translated locally, possibly using underlying separately produced keys (three forms, Table 7), or produced with assistance from a remote key server (one form, Table 8). SKITOs are recursive data structures: in three forms, underlying information is conveyed as a subordinate SKIPO or SKITO.

TABLE 7

Local Translation SKITO Forms

| SKITO Form | Target Key Preparation | Correspondent SKIO Content | Subordinate Objects |
|---|---|---|---|
| Local/Stored Key | Target key stored in key store. | Key store ID. Key ID. | None. |
| Local/Wrapped Key | Target key wrapped. | Wrapped key. KWK SKIO. | Requester-correspondent KWK SKIPO. |
| Local/Split Key | Target key split into shares. | Key share SKIOs. | Requester-correspondent Key Share SKITOs. |

The Local/Stored Key SKITO form indicates that the target key is stored in a key store. The Correspondent SKIO is prepared from a key identifier.

Local/Stored Key SKITO Example Syntax:

```
{   "skitoForm": "localTranslKeyID",    — SKITO form
    "keyClass": <class id>,              — target key class
    "skipr": <rule id>,                  — production rule
    "skitoParams": <params>,             — SKITO parameters
    "storeClass": <class ID>,            — key store class
    "storeID": <store ID>                — key store identifier
}
```

Local/Stored Key SKITO Example Processing Steps:
(input=SKITO+target key+key parameters+translation parameters, mappings per production rule)
(1) Map target key class, SKITO parameters, key parameters, and translation parameters to SKIO parameters and additional secrets.
(2) Map target key class and SKIO parameters to a wrapping parameter string.
(3) Map target key and additional secrets to encoded key string.
(4) Apply key store class-defined key storage interface to key store identifier, wrapping parameter string, and encoded key string to obtain key identifier.
(5) Prepare Correspondent SKIO from SKIO parameters, key store identifier, and key identifier.
(6) Return Correspondent SKIO.

The Local/Wrapped key SKITO Form indicates that the target key is wrapped with a KWK. The Correspondent SKIO is prepared from a wrapped key and a KWK SKIO.

Example Local/Wrapped Key SKITO Syntax:

```
{   "skitoForm": "localTranslWrapped",   — SKITO form
    "keyClass": <class id>,              — target key class
    "skipr": <rule id>,                  — production rule
    "skitoParams": <params>,             — SKITO parameters
    "kwkSKIPO": <skipo>                  — KWK SKIPO
}
```

Example Local/Wrapped Key SKITO Processing Steps:
(input=SKITO+target key+key parameters+translation parameters; mappings per production rule)
(1) Map target key class, SKITO parameters, key parameters, and translation parameters to SKIO parameters, additional secrets, and KWK production parameters.
(2) Process KWK SKIPO recursively with KWK production parameters as input to produce KWK SKIO and matching KWK.
(3) Map target key class and SKIO parameters to wrapping parameter string.
(4) Map target key and additional secrets to encoded key string.
(5) Apply KWK class-defined key wrapping function to KWK, wrapping parameter string, and encoded key string to obtain a wrapped key.
(6) Prepare Correspondent SKIO from SKIO parameters, KWK SKIO, and wrapped key.
(7) Return Correspondent SKIO.

The Local/Split Key SKITO Form indicates that the target key is split into shares. The Correspondent SKIO is prepared from key share SKIOs.

Local/Split Key SKITO Example Syntax:

```
{   "skitoForm": "localTranslSplit",     — SKITO form
    "keyClass": <class id>,              — target key class
    "skipr": <rule id>,                  — production rule
    "skitoParams": <params>,             — SKITO parameters
    "shareSKITO": <skitos>               — key share SKITOs
}
```

Local/Split Key SKITO Example Processing Steps:
(input=SKITO+target key+key parameters+translation parameters, mappings per production rule)
(1) Map target key class, SKITO parameters, key parameters, and translation parameters to SKIO parameters, per-share key parameters, and per-share translation parameters.
(2) Apply key share class-defined key splitting function to target key to obtain total number of key shares. The total number and the threshold are determined by a production rule.
(3) Process each key share SKITO recursively with respective key share, per-share key parameters, and per-share translation parameters as input to produce key share SKIOs.
(4) Prepare Correspondent SKIO from SKIO parameters and key share SKIOs.

(5) Map SKIO parameters and per-share key parameters to key parameters.
(6) Return Correspondent SKIO.

TABLE 8

Non-Local Translation SKITO From

| SKITO Form | Description | Subordinate Objects |
|---|---|---|
| Hybrid | Target key translated into Requester SKIO locally. Requester SKIO translated into Correspondent SKIO remotely. | Requester-server target key SKITO. Server-correspondent target key SKITO. |

The non-local hybrid SKITO form indicates that the target key is translated into a Requester SKIO locally. The Requester SKIO is then translated into the Correspondent SKIO remotely.

Non-Local Hybrid SKITO Example Syntax:

```
{   "skitoForm": "hybridTransl",    — SKITO form
    "skitoParams": <params>,        — SKITO parameters
    "skirpSrv": <uri>,              — remote service endpoint
    "reqSKITO": <skito>,            — Requester SKITO
    "corSKITO": <skito>,            — Correspondent SKITO
    "skirpInfo": <string>           — additional information (optional)
}
```

Non-Local Hybrid SKITO Example Processing Steps:
(input=SKITO+target key+key parameters+translation parameters, mappings per production rule)
(1) Map target key class, SKITO parameters, key parameters, and translation parameters to requester translation parameters and correspondent translation parameters.
(2) Process Requester SKITO with target key, key parameters, and requester translation parameters as input to produce Requester SKIO.
(3) Prepare SKIRP translation request from Requester SKIO, Correspondent SKITO, and correspondent translation parameters.
(4) Send request to service endpoint for remote processing.
(5) Receive SKIRP response including Correspondent SKIO.
(6) Return Correspondent SKIO.

The target key class and production rule for non-local hybrid SKITOs are based on a Correspondent SKITO.

XXVIII. SKIRPs

A Symmetric Key Information Resolution Protocol (SKIRP) is a protocol for interacting with a key server to resolve a SKIPO and/or SKITO into one or more SKIOs. There are three such protocols, reflected in Table 9, corresponding to three SKIPO remote processing forms. (The third form also supports the SKITO remote processing form.) The protocols are described in terms of processing respective request and response objects, reflected in Table 10. The resolution protocol provides a way for requester to obtain SKIOs for use with correspondents without previously sharing a symmetric key; requesters can just establish a secure connection with a SKIRP service endpoint. (The SKIRP service endpoint to which the request is sent is implicitly part of the request and is not shown explicitly in the examples below.) The protocols may use additional information returned from a SKIPP response (see Section XXIX, below) to support the resolution operation (e.g., wrapped keying material).

TABLE 9

SKIRP Protocols

| Protocol | Request Form | Response Form |
|---|---|---|
| Pair Production I | Pair production request I | Pair production response |
| Pair Production II | Pair production request II | Pair production response |
| Translation | Translation request | Translation response |

TABLE 10

SKIRP Request and Response Forms

| Form | Description | Subordinate Objects |
|---|---|---|
| Pair production request I | Requester SKIO produced, translated into matching Correspondent SKIO | Requester SKIPO, Correspondent SKITO |
| Pair production request II | Correspondent SKIO produced, translated into matching Requester SKIO | Requester SKITO, Correspondent SKIPO |
| Pair production response | Requester SKIO, matching Correspondent SKIO returned | Requester SKIO, Correspondent SKIO |
| Translation request | Requester SKIO translated into Correspondent SKIO | Requester SKIO, Correspondent SKITO |
| Translation response | Correspondent SKIO returned | Correspondent SKIO |

The SKIRP Pair Production Request Type I indicates that the Requester SKIO is produced and translated into matching Correspondent SKIO.

SKIRP Pair Production I Example Syntax:

```
{   "skirpForm": "pairProdReqI",    — SKIRP form
    "reqSKIPO": <skipo>,            — Requester SKIPO
    "reqParams": <params>,          — requester production parameters
    "corSKITO": <skito>,            — Correspondent SKITO
    "corParams": <params>,          — correspondent translation parameters
    "skirpInfo": <string>           — additional information (optional)
}
```

SKIRP Pair Production Request Type I Example Processing Steps:
(input=SKIRP request)
(1) Process Requester SKIPO with requester production parameters as input to produce Requester SKIO, target key, and key parameters.
(2) Process Correspondent SKITO with target key, key parameters, and correspondent translation parameters as input to produce Correspondent SKIO.
(3) Prepare SKIRP pair production response from Requester SKIO and Correspondent SKIO.
(4) Return SKIRP pair production response.

The SKIRP Pair Production Request Type II form indicates that the Correspondent SKIO is produced and translated into a matching Requester SKIO.

SKIRP Pair Production Request Type II Example Syntax:

```
{   "skirpForm": "pairProdReqII",   — SKIRP form
    "reqSKITO": <skito>,            — Requester SKITO
    "reqParams": <params>,          — requester translation parameters
    "corSKIPO": <skipo>,            — Correspondent SKIPO
    "corParams": <params>,          — correspondent production parameters
    "skirpInfo": <string>           — additional information (optional)
}
```

SKIRP Pair Production Request Type II Example Processing Steps:
(input=SKIRP request)
(1) Process Correspondent SKIPO with correspondent production parameters as input to produce Correspondent SKIO, target key, and key parameters.
(20 Process Requester SKITO with target key, key parameters, and requester translation parameters as input to produce Requester SKIO.
(2) Prepare SKIRP pair production response from Requester SKIO and Correspondent SKIO.
(3) Return SKIRP pair production response.

The SKIRP Pair Production Response indicates that the Requester SKIO and matching Correspondent SKIO are returned.

Example SKIRP Pair Production Response Syntax:

```
{   "skirpForm" : "pairProdResp",   — SKIRP form
    "reqSKIO": <skio>,              — Requester SKIO
    "corSKIO": <skio>,              — Correspondent SKIO
    "skirpInfo": <string>,          — additional information (optional)
}
```

Note that the Requester SKIO and the Correspondent SKIO are processed separately by the requester and correspondent.

The SKIRP Translation Request indicates that the Requester SKIO is translated into a matching Correspondent SKIO.

SKIRP Translation Request Example Syntax:

```
{   "skirpForm": "transReq",    — SKIRP form
    "reqSKIO": <skio>,          — Requester SKIO
    "corSKITO": <skito>,        — Correspondent SKITO
    "corParams": <params>,      — correspondent translation parameters
    "skirpInfo": <string>       — additional information (optional)
}
```

SKIRP Translation Request Example Processing Steps:
(input=SKIRP request)
(1) Process Requester SKIO to obtain target key and key parameters.
(2) Process Correspondent SKITO with target key, key parameters, and correspondent translation parameters as input to produce Correspondent SKIO.
(3) Prepare SKIRP translation response from Correspondent SKIO.
(4) Return SKIRP translation response.

The SKIRP Translation Response indicates that a Correspondent SKIO is returned.

SKIRP Translation Response Example Syntax:

```
{   "skirpForm": "transResp",   — SKIRP form
    "corSKIO": <skio>           — Correspondent SKIO
}
```

The Correspondent SKIO is processed separately by the correspondent

XXIX. SKIPPs

A SKIRP may have a corresponding Symmetric Key Information Provisioning Protocols (SKIPP) that provisions the key server. A SKIPP is a protocol for interacting with a provisioning server to provision a remote service endpoint at a key server, by which the key server may interact with a requester to resolve a SKIPO and/or SKITO. There are three such protocols, reflected in Table 11, corresponding to the three SKIRP protocols. The protocols are again described in terms of processing respective request and response objects, reflected in Table 12. The provisioning protocols provide a way for a correspondent to configure a key server to interact with requesters with which the correspondent has not previously shared a symmetric key. The provisioning protocols return a remote service endpoint and optionally additional information to be provided to the key server in a SKIRP request to support the resolution operation (e.g., wrapped keying material).

TABLE 9

SKIPP Protocols

| Protocol | Request Form | Response Form |
|---|---|---|
| Pair Production I | Pair production request I | Remote endpoint |
| Pair Production II | Pair production request II | Remote endpoint |
| Translation | Translation request | Remote endpoint |

TABLE 10

SKIPP Request and Response Forms

| Form | Description | Subordinate Objects |
|---|---|---|
| Pair production request I | Remote endpoint configured to produce Requester SKIO, translate into matching Correspondent SKIO | Requester SKIPO, Correspondent SKITO |
| Pair production request II | Remote endpoint configured to produce Correspondent SKIO, translate into matching Requester SKIO | Requester SKITO, Correspondent SKIPO |
| Translation request | Remote endpoint configured to translate Requester SKIO into matching Correspondent SKIO | Requester SKIO, Correspondent SKIO |
| Remote endpoint | Remote endpoint configured per request | None |

The SKIPP Pair Production Request Type I indicates that the remote endpoint is configured to produce a Remote SKIO and translate it into a matching Correspondent SKIO.

SKIPP Pair Production I Example Syntax:

```
{   "skippForm": "pairProdReqI",    — SKIPP form
    "reqSKIPO": <skipo>,            — Requester SKIPO
    "corSKITO": <skito>,            — Correspondent SKITO
}
```

SKIPP Pair Production Request Type I Example Processing Steps:
(input=SKIPP request)
(1) Create new remote service endpoint and configure for SKIRP Pair Production I operations with the Requester SKIPO and the Correspondent SKITO.
(2) Prepare SKIRP remote endpoint response from remote service endpoint and optionally additional information for resolution operation.
(3) Return SKIRP response.

The SKIPP Pair Production Request Type II indicates that the remote endpoint is configured to produce a Correspondent SKIO and translate it into a matching Requester SKIO.

SKIPP Pair Production II Example Syntax:

```
{   "skippForm": "pairProdReqII",    — SKIPP form
    "reqSKITO": <skipo>,              — Requester SKITO
    "corSKIPO": <skito>,              — Correspondent SKIPO
}
```

SKIPP Pair Production Request Type II Example Processing Steps:
(input=SKIPP request)
(1) Create new remote service endpoint and configure for SKIRP Pair Production I operations with the Requester SKITO and the Correspondent SKIPO.
(2) Prepare SKIRP remote endpoint response from remote service endpoint and optionally additional information for resolution operation.
(3) Return SKIRP pair production response.

The SKIPP Translation Request indicates that the remote endpoint is configured to translate a Requester SKIO into a matching Correspondent SKIO. For a SKIRP translation request supporting a Hybrid form SKIPO, the Requester SKIO will have been produced by the requester via a Requester SKIPO. For a SKIRP translation request supporting a Hybrid form SKITO, the Requester SKIO will have bene produced by the requester via a Requester SKITO. Accordingly, the SKIPP Translation Request includes either a Requester SKIPO or a Requester SKITO.

SKIPP Translation Request Example Syntax, supporting Hybrid Production:

```
{   "skippForm": "translReqI",       — SKIPP form
    "reqSKIPO": <skipo>,              — Requester SKIPO
    "corSKIPO": <skito>,              — Correspondent SKIPO
}
```

SKIPP Translation Example Syntax, supporting Hybrid Translation:

```
{   "skippForm": "translReqII",      — SKIPP form
    "reqSKITO": <skipo>,              — Requester SKITO
    "corSKIPO": <skito>,              — Correspondent SKIPO
}
```

SKIPP Translation Example Processing Steps:
(input=SKIPP request)
(1) Create new remote service endpoint and configure for SKIRP Pair Production I operations with the Requester SKIPO or SKITO (i.e., where the Requester SKIO to be provided will have been produced or translated with such an object) and the Correspondent SKIPO.
(2) Prepare SKIRP remote endpoint response from remote service endpoint and optionally additional information for resolution operation.
(3) Return SKIRP pair production response.

The SKIPP Remote Endpoint Response indicates that a remote service endpoint and optionally additional information for the resolution request is returned.

SKIPP Translation Response Example Syntax:

```
{   "skippForm": "skirpSrv",         — SKIPP form
    "skirpSrv": <skipo>,              — remote service endpoint
    "skirpInfo": <string>,            — additional information (optional)
}
```

XXX: SKIPRs

A Symmetric Key Information Production Rule (SKIPR, also referred to as a "production rule") is a customized profile guiding production, validation and processing of a SKIO and its associated keys.

A SKIPR provides details on the parameters involved, the mappings between parameters, and the mappings to inputs to underlying cryptographic operations. The mapping may involve copying existing parameters, changing names, values, and/or syntax of existing parameters, and adding new parameters (e.g., a nonce and/or a timestamp). SKIPRs may be referenced in SKIOs, SKIPOs, and SKITOs. The processing of the relevant data structures may also include the validation of production rule constraints.

There are five groups of SKIPRs, based on form of SKIO involved: Exported Key Group, Stored Key Group, Derived Key Group, Wrapped Key Group, and Split Key Group.

The Exported Key SKIPR Group includes SKIPRs with production rules that govern SKIOs in exported key form and provide details on following parameters (e.g., which parameter types are required/optional, constraints on their values):
(1) SKIO parameters for SKIOs in exported key form;
(2) key parameters for keys produced by processing, or in conjunction with, SKIOs in this form; and
(3) SKIPO parameters and production parameters for SKIPOs in local production/exported key form.

SKIPR rules also provide details on various mappings in SKIO exported key form and SKIPO local production/exported key identifier, including mapping to a derivation parameter string input to an underlying key exporter class. Rules that support remote production also provide details on various mappings in non-local SKIPO forms referencing the SKIPR.

The Stored Key SKIPR Group includes SKIPRs with production rules that govern SKIOs in stored key form and provide details on the following parameters:
(1) SKIO parameters for SKIOs in stored key form;
(2) key parameters for keys produced by processing, or in conjunction with, SKIOs in this form;
(3) SKIPO parameters and production parameters for SKIPOs in local production/stored key form; and
(4) SKITO parameters and translation parameters for SKITOs in local translation/stored key form.

SKIPR rules also provide details on various mappings in SKIO stored key form, SKIPO local production/stored key form, and SKITO local translation/stored key form, including mapping to a wrapping parameter string and an encoded key string input to an underlying key store class. Rules that support remote production/translation also provide details on various mappings in non-local SKIPO and SKITO forms referencing the SKIPR, including which other SKIPRs can be translated to the SKIPR.

The Derived Key SKIPR Group includes SKIPRs that govern SKIOs in derived key form and provide details on the following parameters (e.g., which parameter types are required/optional, constraints on their values):
(1) SKIO parameters for SKIOs in derived key form;
(2) key parameters for keys produced by processing, or in conjunction with, SKIOs in this form; and
(3) SKIPO parameters and production parameters for SKIPOs in local production/derived key form.

Derived Key SKIPR rules also provide details on various mappings in SKIO derived key form and SKIPO local production/derived key form, including mapping to a derivation parameter string input to an underlying key derivation function. Such rules may also specify constraints on the number of subordinate KDK(s) involved. Rules that support remote production also provide details on various mappings in non-local SKIPO forms referencing the SKIPR.

The Wrapped Key SKIPR Group includes SKIPRs that govern SKIOs in wrapped key form and provide details on the following parameters:
(1) SKIO parameters for SKIOs in wrapped key form;
(2) key parameters for keys produced by processing, or in conjunction with, SKIOs in this form;
(3) SKIPO parameters and production parameters for SKIPOs in local production/wrapped key form; and
(4) SKITO parameters and translation parameters for SKITOs in local translation/wrapped key form.

Wrapped Key SKIPR rules also provide details on various mappings in SKIO wrapped key form, SKIPO local production/wrapped key form, and SKIPO local translation/wrapped key form, including mapping to a wrapping parameter string and an encoded key string input to an underlying key wrapping function. Rules that support remote production/translation also provide details on various mappings in non-local SKIPO and SKITO forms referencing the SKIPR, including which other SKIPRs can be translated to the SKIPR.

The Split Key SKIPR group includes SKIPRs that govern SKIOs in split key form and provide details on the following parameters:
(1) SKIO parameters for SKIOs in split key form;
(2) key parameters for keys produced by processing, or in conjunction with, SKIOs in this form;
(3) SKIPO parameters and production parameters for SKIPOs in local production/split key form; and
(4) SKITO parameters and translation parameters for SKITOs in local translation/split key form.

Split Key SKIPR rules also provide details on various mappings in SKIO split key form, SKIPO local production/split key form, and SKIPO local translation/split key form. Such rules may also specify constrains on number of key shares involved. Rules that support remote production/translation also provide details on various mappings in non-local SKIPO and SKITO forms referencing the SKIPR, including which other SKIPRs can be translated to the SKIPR.

Certain embodiments can be performed using a computer program or set of programs. The computer programs can exist in a variety of forms both active and inactive. For example, the computer programs can exist as software program(s) included of program instructions in source code, object code, executable code or other formats, firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method to establish communication between a client and a server, the method comprising:
    receiving, by the server, a request from the client to establish a connection for use by the client and the server;
    selecting, by the server, use of a previously established shared symmetric key with the client, the previously established shared symmetric key being established for use by the client and the server prior to the server receiving the request, wherein the shared symmetric key is obtained by using a selected key production record and using a key production key;
    receiving, by the server, a communication from the client identifying the previously established shared symmetric key;
    determining whether the client request is legitimate or attacking the server based on the communication from the client; and
    based on the determination,
        establishing, by the server, the connection between the client and the server if the client request is determined to be legitimate; or
        not establishing, by the server, the connection between the client and the server if the client request is determined to be attacking the server.

2. The method of claim 1, wherein the communication from the client for the previously established shared symmetric key comprises a presence of the previously established shared symmetric key and properties of the previously established shared symmetric key.

3. The method of claim 1, further comprising:
    determining, by the server, a priority for establishing the connection between the client and the server based on a vetting status of the client, wherein the vetting status of the client is determined prior to the server receiving the request from the client to establish the connection between the client and the server.

4. The method of claim 1, wherein the previously established shared symmetric key is an External Pre-Shared Key.

5. The method of claim 1, wherein the previously established shared symmetric key is established out of band.

6. The method of claim 1, further comprising:
    referring, by the server, the client to a second server to establish a second connection between the client and the second server, wherein the second server is in a trusted relationship with the server.

7. The method of claim 6, wherein the second connection between the client and the second server is based on a previously shared group key among the client, the server, and the second server.

8. The method of claim 1, wherein the previously established shared symmetric key comprises a Transport Layer Security (TLS) symmetric pre-shared key.

9. The method of claim 1, wherein the server receives the request from the client via a secure transport, wherein the secure transport comprises at least one of an HTTP over Transport Layer Security (TLS), a domain name system over TLS (DNS-over-TLS), a Datagram TLS, a virtual private network secured with IPsec, or a Cryptographic Message Syntax.

10. The method of claim 1, wherein the server is a web server, a domain name system server, or an email server.

11. The method of claim 1, wherein the previously established shared symmetric key is associated with a plurality of users.

12. The method of claim 1, wherein if the client request is assessed to be part of a Distributed Denial of Service (DDoS) attack, the client is determined to be attacking the server.

13. The method of claim 1, further comprising:
generating, by the server, the use of the previously established shared symmetric key.

14. A system for establishing communication between a client and a server, the system comprising a server computer communicatively coupled to the internet and configured to perform operations comprising:
receiving, by the server, a request from the client to establish a connection between the client and the server;
requesting, by the server, use of a previously established shared symmetric key from the client, the previously established shared symmetric key being established for use by the client and the server prior to the server receiving the request, wherein the shared symmetric key is obtained by using a selected key production record and using a key production key;
receiving, by the server, a response from the client identifying the previously established shared symmetric key;
determining whether the client is legitimate or attacking the server based on the response from the client; and
based on the determination,
establishing, by the server, the connection between the client and the server if the client is determined to be legitimate; or
not establishing, by the server, the connection between the client and the server if the client is determined to be attacking the server.

15. The system of claim 14, wherein the response from the client for the previously established shared symmetric key comprises a presence of the previously established shared symmetric key and properties of the previously established shared symmetric key.

16. The system of claim 14, the operations further comprising:
determining, by the server, a priority for establishing the connection between the client and the server based on a vetting status of the client, wherein the vetting status of the client is determined prior to the server receiving the request from the client to establish the connection between the client and the server.

17. The system of claim 14, wherein the previously established shared symmetric key is an External Pre-Shared Key.

18. The system of claim 14, wherein the previously established shared symmetric key is established out of band.

19. The system of claim 14, wherein the operations further comprising:
referring, by the server, the client to a second server to establish a second connection between the client and the second server, wherein the second server is in a trusted relationship with the server.

20. A non-transitory computer-readable storage medium containing instructions that, when executed by a processor, cause the processor to perform a method comprising:
receiving, by the server, a request from the client to establish a connection between the client and the server;
requesting, by the server, use of a previously established shared symmetric key from the client, the previously established shared symmetric key being established for use by the client and the server prior to the server receiving the request, wherein the shared symmetric key is obtained by using a selected key production record and using a key production key;
receiving, by the server, a response from the client identifying the previously established shared symmetric key;
determining whether the client is legitimate or attacking the server based on the response from the client; and
based on the determination,
establishing, by the server, the connection between the client and the server if the client is determined to be legitimate; or
not establishing, by the server, the connection between the client and the server if the client is determined to be attacking the server.

* * * * *